Feb. 2, 1937.   J. SLEPIAN ET AL   2,069,283
ELECTRIC ARC DEVICE
Filed July 30, 1932   6 Sheets-Sheet 2

INVENTORS.
Joseph Slepian
and Leon R. Ludwig.
BY O.D. Buchanan
ATTORNEY

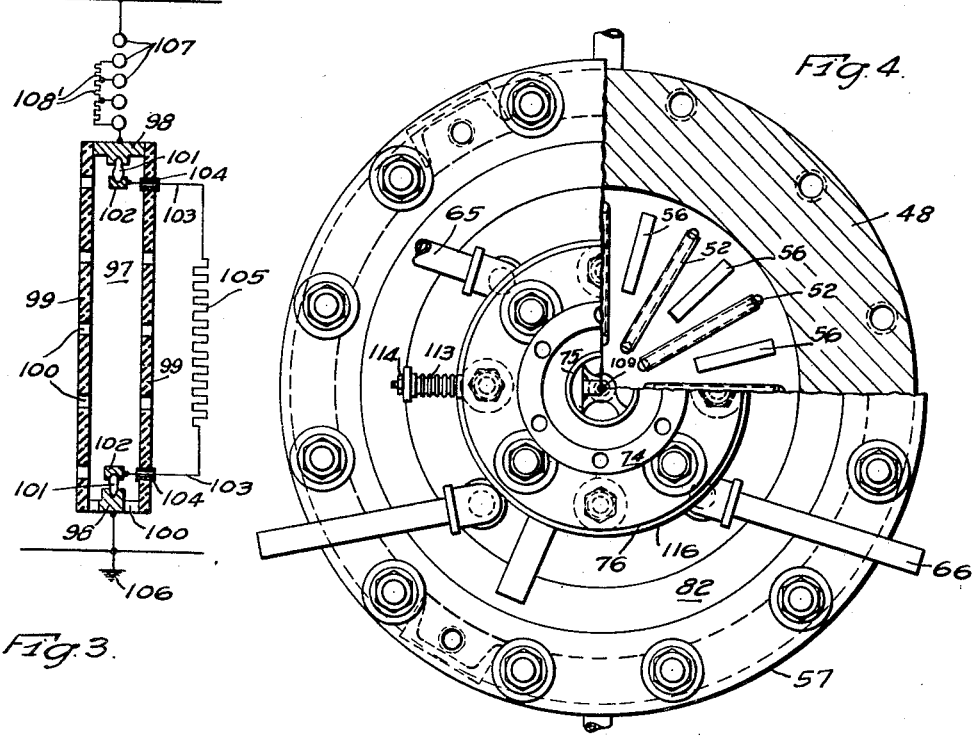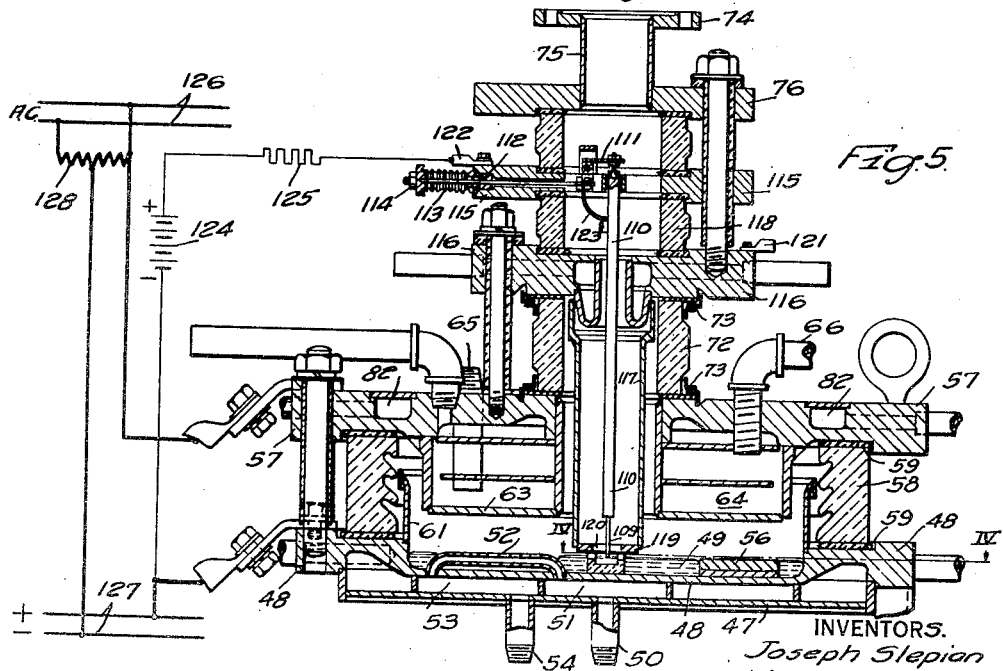

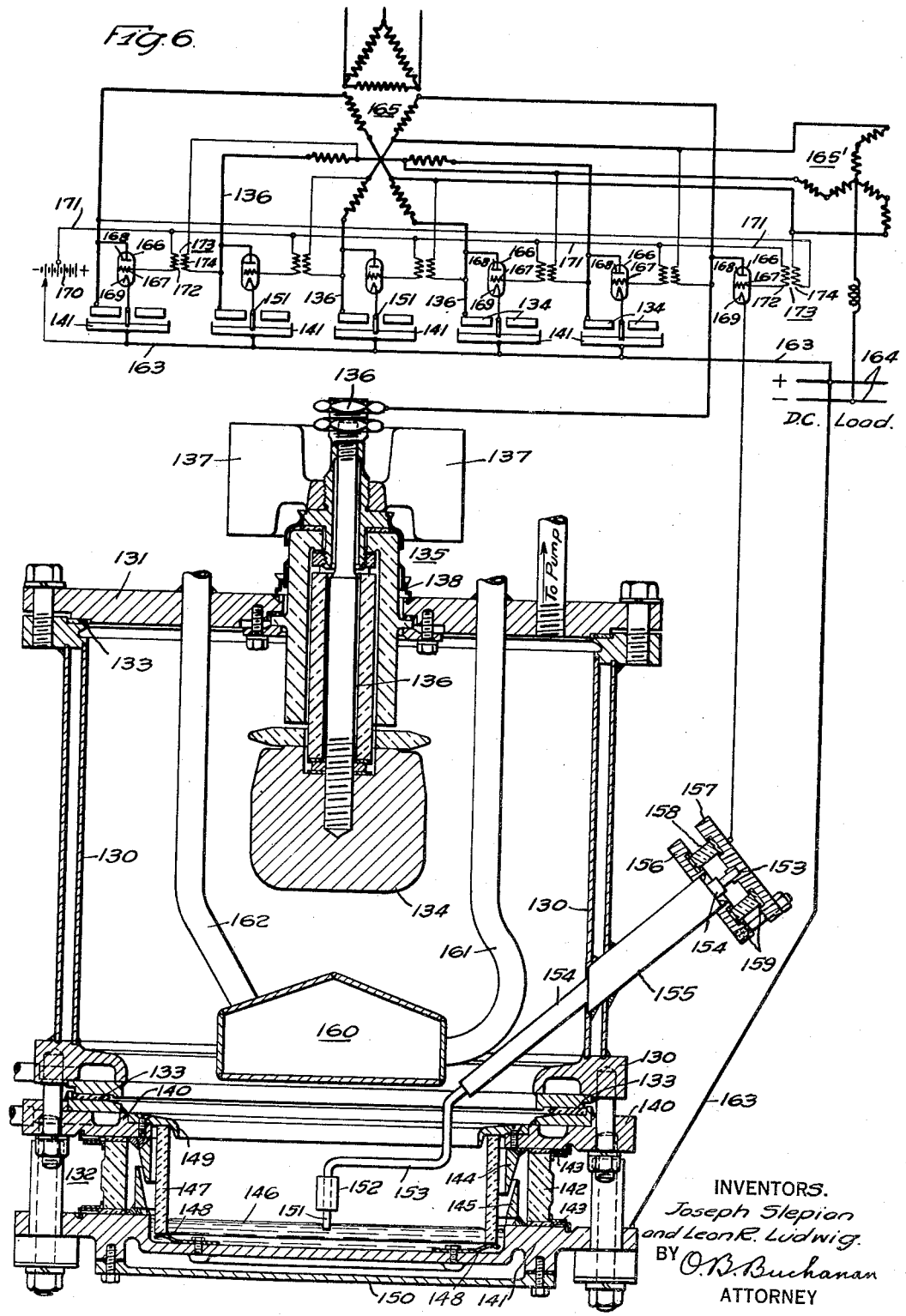

Feb. 2, 1937.   J. SLEPIAN ET AL   2,069,283
ELECTRIC ARC DEVICE
Filed July 30, 1932   6 Sheets-Sheet 5
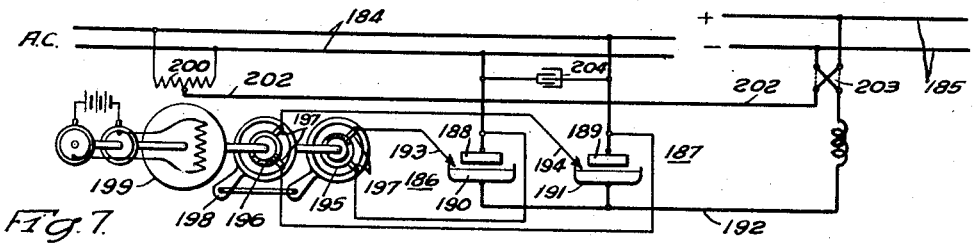
Fig. 7.
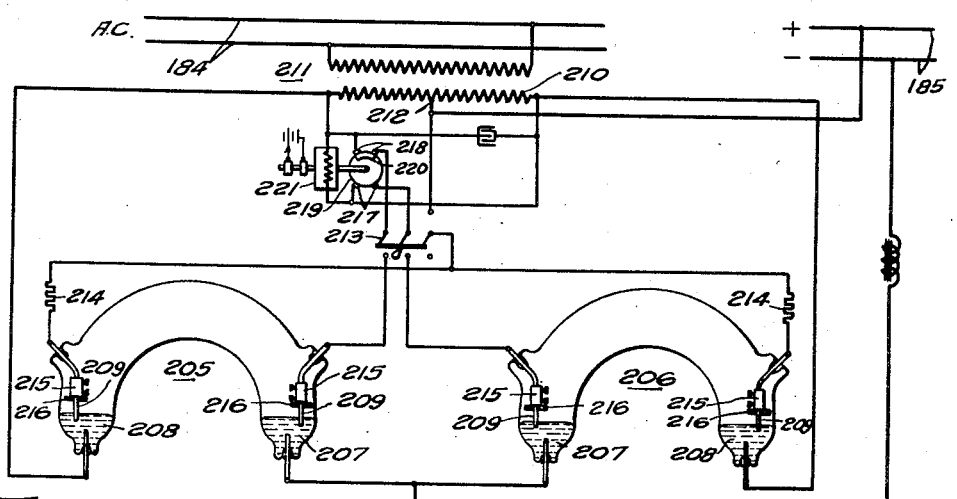
Fig. 8.
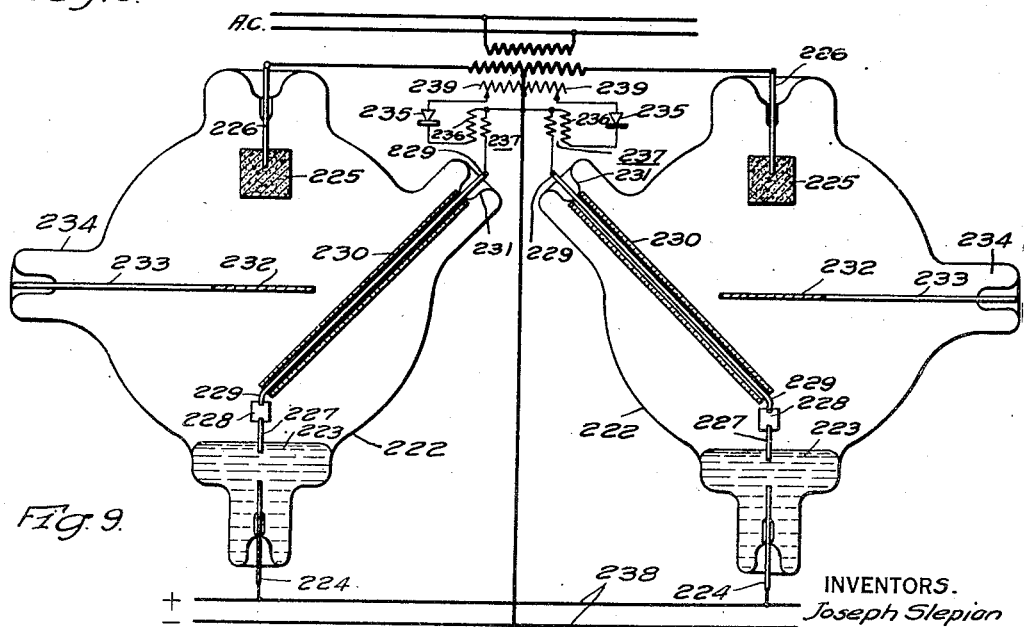
Fig. 9.
INVENTORS.
Joseph Slepian
and Leon R. Ludwig.
BY 
ATTORNEY Feb. 2, 1937.  J. SLEPIAN ET AL  2,069,283
ELECTRIC ARC DEVICE
Filed July 30, 1932  6 Sheets-Sheet 6
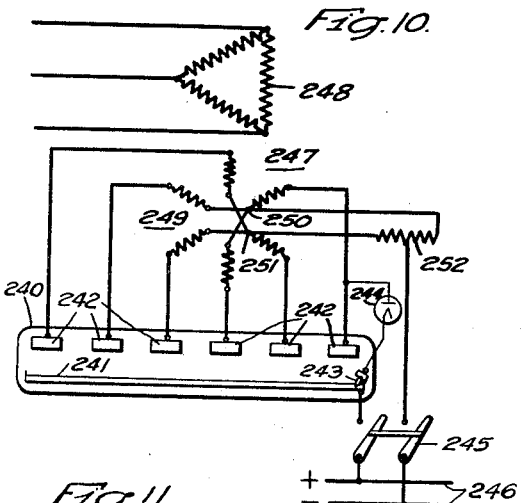
Fig. 10.
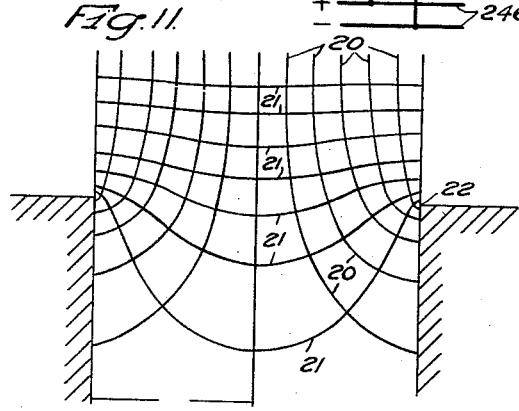
Fig. 11.
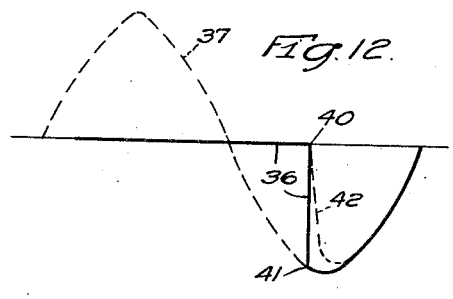
Fig. 12.
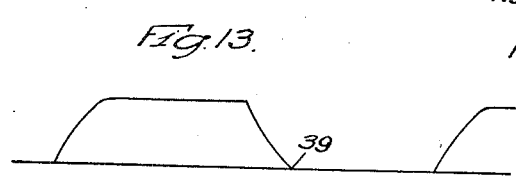
Fig. 13.
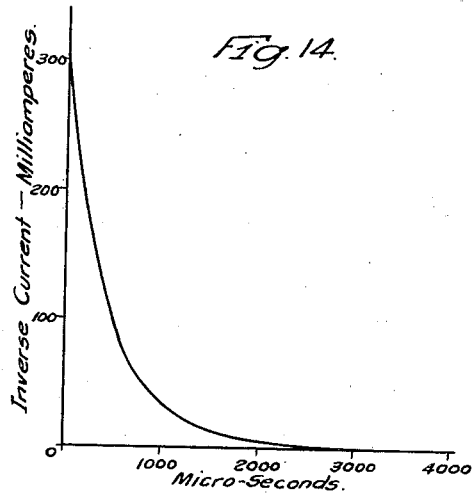
Fig. 14.
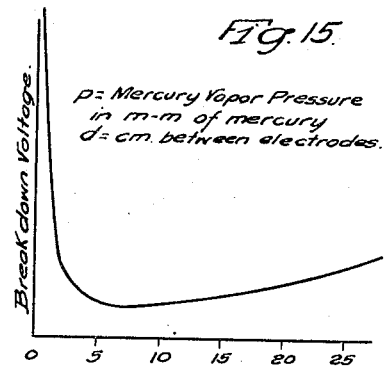
Fig. 15.
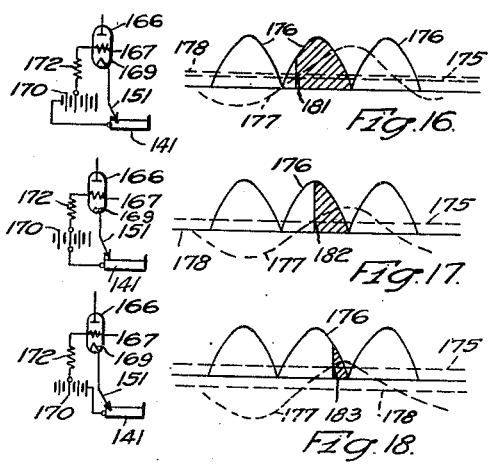
Fig. 16.
Fig. 17.
Fig. 18.
INVENTORS.
Joseph Slepian
and Leon R. Ludwig.
BY O. B. Buchanan
ATTORNEY Patented Feb. 2, 1937

2,069,283

UNITED STATES PATENT OFFICE 2,069,283

ELECTRIC ARC DEVICE

Joseph Slepian, Pittsburgh, and Leon R. Ludwig, Wilkinsburg, Pa., assignors to Westinghouse Electric & Manufacturing Company, East Pittsburgh, Pa., a corporation of Pennsylvania Application July 30, 1932, Serial No. 626,866

57 Claims. (Cl. 175—363)

Our invention relates to electric arc devices and it has particular relation to such devices which operate with a novel stationary poorly conducting make-alive device, and to improvements, some of them of a more general nature, which have been introduced for the purpose of overcoming the difficulties encountered in electric vapor-arc devices utilizing our new make-alive.

Our invention centers around a new type of make-alive device comprising means for forming a cathode-spot on one of the main electrodes of a gap or arc device, such as a vapor-arc rectifier or inverter, or an open-air or evacuated switching arc device, either of general utility for circuit making or breaking, or of special utility as in lightning arresters.

More particularly, our invention relates to a new flat type of vapor-arc rectifier or inverter for which we have coined the word "vectrion", by which we mean to convey that it relates to the carrying of current by positive or negative ions or electrons. This may be briefly explained as follows.

Our researches in mercury-arc rectifiers, and in the causes of backfires therein, have pointed to the fact that the more the back-current is reduced, the fewer will be the backfires occurring in a given space of time, during the non-arcing periods. This has led us to devise a new type of rectifier or vectrion in which the average back-current approaches almost absolutely zero, being preferably less than one to ten micro-amperes per square inch of the effective main-anode surface for a device rated at 600 volts direct-current, with lower and higher tolerances for higher and lower voltages, respectively. This should be compared with the ordinary multi-anode mercury-arc rectifier where the back-current is kept to a value of 10 to 100 micro-amperes per square inch of anode surface only by the use of elaborate anode shields, baffles and grids, and where, if these shields and grids are removed, the back-current rises to 10,000 micro-amperes per square inch, or even higher.

In the conventional types of mercury-arc rectifiers heretofore utilized, an arc has been playing in the device all during the non-arcing period, either due to arcs terminating on other main anodes or arcs terminating on a make-alive anode, or both. As a result, the arcing space between the main anodes which are supposed to be non-conducting during their non-arcing periods is filled with ions and electrons. The result of this is that an arc space, or separation of electrodes, which is shown by tests, in the absence of free electrons and ions, to be able to withstand voltages many times higher than the voltages impressed on it during the recifier operation frequently breaks down with the formation of a cathode spot, and we believe that the probability of the formation of such a cathode spot is greatly enhanced by the existence of back-current.

The most important feature of our new rectifier or vectrion, therefore, is the elimination of all but one of the main anodes, and the elimination of the ordinary keep-alive arc which burns during the non-arcing periods; or, more broadly, the elimination of all means which supply any substantial numbers of ions or electrons to the arcing space during the backfire periods. This has involved the invention and use of the make-alive device heretofore mentioned.

Our invention thus aims to prevent the inception of backfire-causes in vapor-arc rectifiers or inverters, rather than merely attempting to prevent the backfire-causes from becoming complete backfires. We find that the existence of back-current seems to be essential for the occurrence of a backfire-cause, and that as the back-current is reduced, the backfire-causes become less frequent, and probably do not occur at all if the back-current is reduced to zero.

Having eliminated backfire-causes, by substantially eliminating the back-current of a few milliamperes during the backfire periods, we avoid the necessity for many features which have heretofore been necessary in ordinary mercury-arc rectifiers. Thus, we can in many instances omit all shielding in the arc space, thus making a smaller rectifier and very materially reducing the arc voltage or losses in the device. We can reduce the spacing between the main anode and the cathode, thus still further reducing the size and the losses.

Since there is no back-current, no backfire-cause will exist if mercury particles are thrown onto the anode from the surface of the cathode, or if mercury particles condense on the anode, so that the anode may be placed very close to the cathode and in direct exposure thereto, and so that the anode may be operated at a rather cold temperature, as compared to ordinary mercury-arc rectifier practice, because it is no longer necessary to guard against the possibility of condensed mercury on the anode, which always seemed to bring about a high frequency of backfire causes in previous designs. The operation of the anode at a cold temperature, compared to previous rectifier practice, preferably of the order of 80° or 100° to perhaps 250° or 300° C., or even higher, for mercury-arc rectifiers of our new design, is frequently desirable, also, on account of the closeness of our anode to the cathode, the low anode temperature being generally required in order to keep down the vapor pressure to the desired amount, in spite of drops of mercury impinging upon the anode. This reduced vapor pressure still further increases the negative voltage which the arc space will withstand, without break-down, during the non-arcing periods.

In operating our so-called "flat" rectifier, as above described, that is, a rectifier consisting of a flat anode of a size commensurate with the cathode and spaced close to the cathode, by a spacing of the order of from one-half of an inch to four inches, or more, the active surface of the cathode comprising a vaporizable reconstructing material, such as mercury or mixtures containing mercury, or gallium or mixtures containing gallium, we find it important or desirable to very thoroughly cool the cathode, in fact, operating at as cool a temperature as is conveniently obtainable, and we find it highly desirable to utilize some sort of cathode-spot fixation-means, and preferably a well cooled cathode spot-fixation means, as our tests have shown that the probability of backfire is very greatly reduced with such an arrangement, probably due to the fact that the vapor blast from the cathode is much less intense when the cathode-spot is fixed and perhaps because the interaction of this vapor blast with the anode somehow brings backfire-causes into being.

Although it is our purpose to reduce the frequency of occurrence of backfire by reducing the magnitude of the back-current, there are transient moments in some cases where our special construction does not accomplish this result. When a rectifier carries current, this current increases to a maximum value and then, at the end of the arcing period, and particularly in case the direct-current circuit contains a considerable amount of inductance, the rectifier current rapidly decreases to zero and the impressed voltage rapidly increases to a high value in the negative direction. Immediately following this current-zero, the arcing space between the anode and the cathode is left in a highly ionized condition and the back current is also quite high, with a consequent high probability of backfire. Within a few micro-seconds the arcing space regains its dielectric condition and state of low-backfire-probability as the ions vanish on account of their diffusion to the walls of the vessel. If negative voltage is applied to the anode immediately after current has been carried, particularly within a few micro-seconds thereafter, there is danger of a breakdown or backfire, because back-current will exist for a short period of time during this so-called transition period from an ionized state to an un-ionized state.

If the direct-current circuit supplied by the rectifier contains a material amount of inductance, it is usually necessary to introduce delay circuits for delaying the rate at which negative voltages will build up on the anode at the terminations of the arcing periods of our device. Such phenomena are not generally observed in previous types of mercury-arc rectifying devices because in such devices one or more arcs have been playing somewhere in the vacuum space all during the non-arcing periods of any particular anode, so that there is in general no notably greater tendency to backfire during the above-described transition period immediately after the arcing period than at any other time during the non-arcing period, because there really was no transition from an ionized state to a non-ionized state, the arc-space being always ionized, with grids and shields being used about the anode, which reduced the magnitude of the back-current from the ionized space.

In the practical utilization of our device, particularly as applied to the transfer of electrical energy in either direction between a three-phase or other poly-phase system and a direct-current system, it is desirable, on account of the fact that each rectifying arc is placed in a separate container, to cause the arc to play during as long an arcing period as possible, so as to get the greatest capacity out of a given rectifying device or vectrion, and to this end we have applied and perfected a triple two-phase transformer connection involving a suitable polyphase interphase transformer, as hereinafter described for use with our device.

In one form of our invention, we utilize an evacuated container which is composed substantially entirely of metal, all portions of said metal being in electrical contact with each other, the cathode being disposed in a quartz or other insulating cathode-receptacle disposed in the bottom of said container, and the main anode being formed on the top wall of the container.

In our flat rectifier or vectrion, we have to guard particularly well against mercury compounds, which we believe to be oxides or nitrides of mercury, or possibly organic compounds which are unstable and which may break down at random intervals, with the liberation of localized gas pockets which reduce the insulating qualities of the arcing space during the non-arcing periods, causing backfires. It is for this reason that we do not preferably cool our anodes below about 80° or 100° C., because these unstable mercury compounds do not seem to be formed if the temperature is kept above the limits just stated. In our rectifier or vectrion, therefore, it is necessary to take particular pains to well treat-out the device before using it, and to provide a container which does not leak, so that nitrogen and oxygen do not enter from the air. If these precautions are observed, the container will not require pumping during its operation.

Our all-metal design, with a quartz cathode receptacle, or the equivalent, is particularly adapted, therefore, for our device, and it is particularly adapted to be utilized in a construction which is permanently sealed, without the use of vacuum pumps during operation.

Since our vectrion consists of but a single asymmetrically conducting path or arc in each container, we may depart from the usual mercury-arc rectifier circuits which employ a plurality of rectifying arcs, by joining together the anodes of all the arcs instead of having the cathodes in common as was perforce necessary in devices utilizing a single common cathode. This has particular advantages in our permanently sealed all-metal tank construction in which the tank has the same potential as the anode. By bussing together the anodes, the problem of mounting any number of our single-arc tanks in a rack or other construction is very much simplified, and if the vectrions are utilized to supply power to a direct-current circuit in which the negative conductor is grounded, as in railway systems, the tanks will all be at ground potential, which is a very considerable advantage.

It will be perceived that the application of our new make-alive principle to vapor-arc rectifiers and inverters has involved many profound changes in the construction and operation of such devices, which have been briefly indicated, in part, in the foregoing paragraphs, and which, in accordance with the statute, will be more fully explained, described, illustrated and claimed in accordance with the best mode in which we have contemplated applying that principle, thus involving many features, which, while particularly designed and developed, and possibly necessary, in connection with our new vectrion, are, many of them, susceptible of general application in conventional types of rectifiers. These features will, therefore, be claimed generically, per se, as well as in combination with the best modes in which we contemplate applying our invention in a practical vectrion.

In its broadest aspects, also, our make-alive device is not limited, in its application, to evacuated vapor-arc asymmetrically conducting devices, but is applicable also to the switching and lightning-arrester arcs, as previously indicated.

With the foregoing objects and fields of application in view, our invention consists in the combinations, structures, or features and systems hereinafter described and claimed, and illustrated in the accompanying drawings, wherein Figure 1 is a diagram of circuits and apparatus showing one of our preferred forms of a permanently sealed all-metal-tank vectrion, with a triple two-phase transformer circuit for transferring power from a three-phase line to a direct-current line, with a delayed circuit means, and with means for varying the point in the cycle at which the make-alive operates, so as to change the direct-current voltage, or if the latter is fixed, the direct-current power which is supplied.

Fig. 3 is an exemplary diagram showing our invention applied to an arcing device other than a rectifier or an inverter, being here illustrated as a lightning arrester.

Fig. 4 is a plan view of a modified vectrion construction somewhat similar to that shown in Fig. 2, but with certain changes which are shown in Fig. 5, a part of Fig. 4 being in section on the section line IV—IV of Fig. 5.

Fig. 5 is a vertical sectional view, with a circuit diagram added, showing an early type of vectrion in which a continuously operating make-alive is utilized, the same being very thoroughly shielded so as to reduce, as much as possible, the back-current during the non-arcing periods.

Fig. 6 is a diagrammatic view of circuits and apparatus showing a modified form of vectrion construction, and a modified form of device for controlling the point in the cycle at which the several make-alive devices operate.

Fig. 7 is a diagrammatic view of circuits and apparatus in which the make-alives are energized by means of a rotating commutator device driven by a synchronous motor energized from the alternating-current system.

Fig. 8 is a diagrammatic view of circuits and apparatus showing a double cathode construction in which the one cathode or the other may be brought into use by energizing the one or the other of two make-alive devices, for causing the vectrion to operate either as a rectifier or as an inverter, a glass-envelope construction being illustrated for the vectrion.

Fig. 9 is a diagrammatic view of circuits and apparatus illustrating another glass-envelope construction utilizing a graphite main anode, a shielded make-alive anode lead, and a shield interposed in the arcing space between the graphite main anode and the cathode.

Fig. 10 is a diagrammatic view illustrating the application of our keep-alive device to a conventional mercury-arc rectifier construction having a plurality of anodes and a single cathode in an evacuated container.

Figs. 11 to 18 are explanatory diagrams hereinafter referred to.

Figure 1:
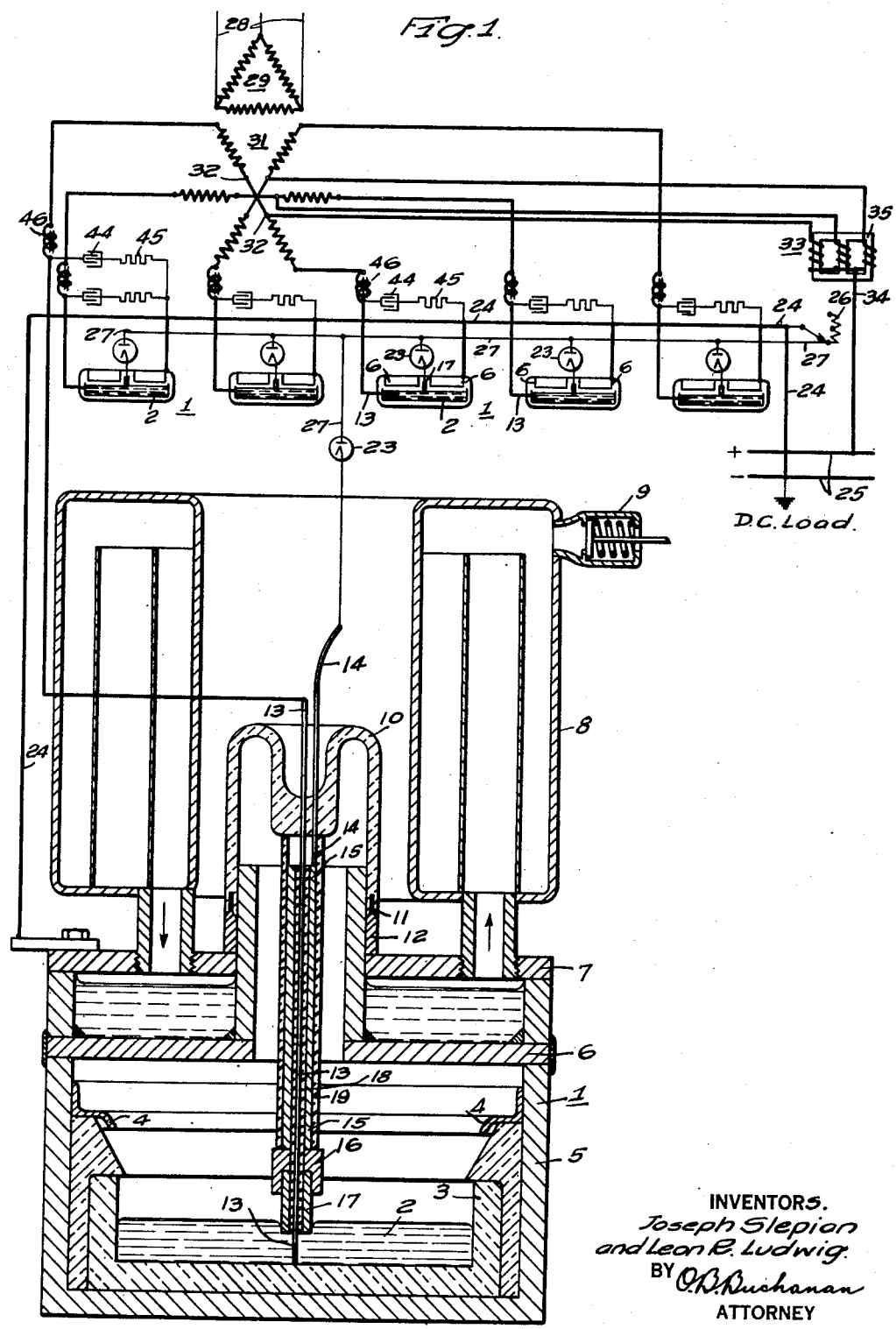

In Fig. 1, we show a rectifier system utilizing six rectifying devices or vectrions all of similar construction, but for the sake of simplicity we have shown only one of the vectrions in detail, the other five being indicated diagrammatically, with the understanding that their construction is identical with that of the first-mentioned vectrion. The vectrion construction here shown is that which we prefer for small devices of a range of from 100 to 500 amperes capacity, although we are not limited to any particular capacity. To convey some idea of the enormous compactness effected by our design, it may be stated that the sectional view in Fig. 1 is a full-scale view of a vectrion designed for a capacity of 100 amperes at 600 bolts direct-current, obtaining this remarkable output with a construction in which the diameter of the arcing space is approximately three inches. This is but a preliminary design which we expect to be able to improve by further modifications, as experience may dictate, so that we expect to utimately obtain a capacity of 150 or 200 amperes out of the same size of design.

As shown in Fig. 1, this particular embodiment of our vectrion consists of a permanently sealed evacuated container 1 composed substantially entirely of metal, such as iron, all portions of said metal being in electrical contact with each other. A cathode 2 of mercury or other vaporizable reconstructing material is disposed in a dish or receptacle 3 of quartz or other insulating material, disposed in the bottom of the tank 1. The quartz or other insulation between the mercury cathode and the tank should be of a type which is not easily bridged by dirt or mercury particles, and to this end it is preferably surmounted by a steel guard ring 4 which keeps mercury off of a portion of its surface.

For conveniece in construction, the metal tank 1 will ordinarily be made in several parts which can be separately prepared and subsequently assembled and welded together. As shown in the drawings, this tank consists of a cup-shaped base portion 5 which contains the cathode receptacle 3 and the guard ring 4. To the top of this base portion 5 is welded a main iron anode 6 having a flat bottom surface spaced by a distance of the order of an inch from the surface of the mercury cathode, the spacing being as small as is consistent with the design-limitations, and being by no means so small as to run any risk of a conducting bridge being formed between the main anode and the cathode by the agitation of the liquid mercury, during the operation of the device.

A water-jacket 7 is provided on the top of the main anode 6 and is surmounted by an air-cooled water-condenser 8 which receives steam from the water-jacket, condenses it, and returns it to the water-jacket, thereby maintaining the anode at a temperature of slightly over 100° C., depending upon the steam-pressure which is permitted to build up in the condenser, said pressure being limited, by a safety-valve 9, to a value corresponding to a temperature of, say 200° C., or other predetermined maximum temperature.

The main anode 6 which constitutes the top of the tank is provided with a central opening in which is sealed an insulator of any suitable type, the same being shown in Fig. 1 as a glass member 10 which is sealed with a glass-seal 11 to a nickel-plated copper ring 12, the lower end of which is brazed to the main anode 6. The glass or other insulator 10 has sealed therein a tungsten cathode lead 13, which extends down centrally through the device into contact with the mercury cathode 2, and a make-alive anode lead 14 which supports a conducting tube 15 terminating, at its lower end, in a tubular nickel holder 16 for a tubular make-alive rod 17 of poorly conducting material such as a molded carborundum material having a clay binder or other binder which does not emit gases under operating conditions, or other poorly conducting material which is not destroyed under the operating conditions, such as a carborundum crystal, a globar rod, a Nernst filament material, ferro-silicon, galena, and probably other similar materials. This make-alive member 17 is stationarily supported so that its lower end is immersed in the liquid mercury cathode 2, and stays immersed throughout the operating conditions. Its supporting tube 15 is insulated from the centrally disposed cathode lead 13 by means of a quartz or other insulating tube 18, and preferably it is shielded externally, also, by means of a larger quartz or other insulating tube 19 surrounding the same as shown in Fig. 1.

The make-alive rod 17 which is immersed in the mercury should have such a resistance that a gradient of about 100 volts per inch, or more, along the rod, will not pass an impractically large current. If the rod is to be of ordinary dimensions, and not in the form of a very thin film, this will require it to be of a material with a resistivity greater than $10^{-2}$ ohms per centimeter cube. At the same time its resistivity should not be too high, because, as will be explained, when the make-alive rod is functioning, an arc forms with cathode on the mercury and with anode momentarily on the side of the make-alive rod. If this momentary current is to flow into the side of the rod without an excessive voltage, the resistivity should not be too high. A resistivity of less than $10^{+5}$ ohms per centimeter cube will generally be low enough for this purpose. A change in the resistivity involves, in general, a change in the current at which the make-alive device operates and the voltage necessary to be impressed thereon to produce this current.

We have considered several theories in an attempt to explain the operation of the carborundum rod or other make-alive device, and at present prefer the following theory which is tentatively offered without any desire to limit ourselves to any particular theory of operation. If a positive potential is applied between the upper portion of the rod and the mercury, a current will flow through the rod to the mercury. When dealing with a solid make-alive rod, or a rod whose cross-sectional area is not very small, it is necessary to use a material whose resistivity is greater than $10^{-2}$ ohms per centimeter cube, which is perhaps at least about 100-fold greater than the resistivity of the mercury. From the standpoint of the theory, therefore, the resistance of the mercury will first be neglected.

The actual current-flow will follow the lines marked 20 in the diagrammatic sketch in Fig. 11. Equipotential lines 21 are also shown in Fig. 11. Under these conditions the current-density along the surface of the rod beneath the mercury level will increase from the bottom of the rod up to the point of emergence of the rod from the mercury, indicated by the numeral 22, at which point the current-density becomes infinite, according to the mathematical theory, if the rod and mercury are assumed to be perfectly continuous, that is, if the actual atomic structure is not considered. Likewise, the voltage gradient along the surface of the rod becomes infinite as the junction with the mercury is approached from above. Mathematically, the gradient along the rod surface near the mercury junction will be given approximately by $$\sqrt{\frac{d}{2}} X_\infty / \sqrt{y}$$

where $d$ is the diameter or thickness of the rod, $X_\infty$ is the gradient along the rod at a great distance from the mercury, and $y$ is the distance from the mercury junction to the point on the rod surface at which the gradient is being obtained. Since the above formula may be expected to be applicable down to atomic distances, that is, down to a value $y=10^{-8}$ centimeters, we see that with $X_\infty$ of the order of 100 volts per centimeter, the gradient within an atomic distance of the mercury junction will be of the order of $10^6$ volts per centimeter.

Several investigators have demonstrated that a voltage gradient of $10^6$ volts per centimeter is sufficient to pull electrons out of a material. Hence it is reasonable to suppose that electrons will be pulled out of the mercury surface close to the junction of the rod, and that the cathode of an arc may be started there, the current of this arc flowing first to the side of the rod, and then flowing to higher and higher points on the rod surface, as the gas space becomes more and more ionized, ultimately bridging the rod and reaching the metal holder of the rod. Thus an arc will be started by the rod if a voltage is impressed upon it giving an average gradient along it of the order of $10^2$ volts per centimeter, and this arc will bridge the rod if the voltage is sufficient to permit considerable current to flow from the side of the rod in the initial arc. If the voltage applied is insufficient for this last purpose, the arc will not bridge the rod but will appear as a tiny spark at the junction of the mercury and the rod.

According to our suggested theory, then, the resistivity of the rod should be such as to permit the application of a gradient of the order of 100 volts per centimeter along it, without excessive current flowing. If the current taken by the rod is to be limited to the order of ten amperes, then the resistance of the rod per centimeter length should be of the order of ten ohms.

By the use of special excitation methods as by condenser discharges, it may sometimes be practical to use larger currents for starting the arc at the rod. By such methods momentary excitation currents of 1000 amperes or even 10,000 amperes may be practical. For such currents, the resistance of the rod per unit lengh may be as low as of the order of $10^{-2}$ ohms.

According to our suggested theory, it is also necessary that sufficient current shall flow in the incipient arc at the mercury junction so that it will quickly advance along and bridge the rod. If the resistance per unit length of the rod is too great, then an excessive voltage will be required for this purpose, and for this reason we place an upper limit of $10^5$ ohms per centimeter length of rod.

While the theory here given applies to a simple rod, it is clear that modifications may be made in shape, or that combinations of completely insulating materials with conducting materials might be used for accomplishing the purpose of the rod. Our invention should then be broadly interpreted as disclosing a means for starting an arc at a conductor surface by producing a very high local gradient for its inception, and causing sufficient current to flow in this incipient arc to ensure its rapid growth.

With a solid molded carborundum make-alive rod consisting of about 70% carborundum and 30% clay binder, and some lamp black, having a resistivity of about 2 ohms per centimeter cube, the rod having a diameter of about a quarter of an inch and having a length of about one-fifth of an inch between its holder and the surface of the mercury when the device is not in operation, we have found that a cathode-spot is formed at the junction of the surface of the rod with the surface of the mercury at a current of 7 amperes through the rod, requiring 35 volts.

The voltage necessary for operating the make-alive rod is preferably obtained from the alternating-current circuit to which the vectrion is connected and is preferably also obtained directly from the main anode of the vectrion in which the make-alive is located. As soon as a cathode-spot is formed at the junction point of the surface of the make-alive rod and the surface of the mercury, an arc is struck across from the main anode to the mercury pool. The make-alive arc has a sufficiently large external voltage-consuming device in series with it to cause it to immediately go out, because it cannot operate in parallel with the main arc which has a much smaller voltage than the over-all voltage of the make-alive circuit. The make-alive arc operates just momentarily, therefore, to produce a cathode-spot on the main cathode at the beginning of the arcing period of the vectrion, and it does not produce any arc at any other time, so that there is no source supplying ions or electrons to the arcing space of the vectrion during the non-arcing period thereof. As previously pointed out, this is an essential feature of our invention, namely, the substantial elimination of the back-currents, which are normally produced, in other vapor-arc rectifiers, by the ions and electrons present in the arcing space during the non-arcing periods thereof.

While the theory of our make-alive device has been indicated with particular reference to a mercury cathode, it is obviously not necessary that the material of the cathode be mercury, or even that it be a liquid. The essential feature appears to be the presence of a sufficiently high potential-gradient at the junction-point between the surface of the make-alive rod and the surface of the cathode. In fact, our make-alive operates very well when immersed in a brass cathode, which may be accomplished by dipping the rod in molten brass and solidifying the brass around one end of it. The make-alive rod will also operate when it is merely in contact with the surface of the brass or other electrode, in which case, however, it should be firmly held down in place, so that its end will not become separated from the cathode, which would quickly burn off the end of the rod.

When the top end of the rod is held in a brass or other solid metal holder, the voltage necessary to send a sufficient current through the rod to form a cathode-spot on the holder, when the holder is negative with respect to the mercury cathode, may be much greater than the voltage necessary to form a cathode-spot on the mercury when the mercury is negative with respect to the holder, this being due probably to the differences in the nature of the contact and the boiling and electron-emission characteristics of the holder. This difference in voltage may be made still greater by making the end of the rod which is in the holder of much larger section than that which dips into the mercury, as will be pointed out in connection with Fig. 2. This difference in the operating voltages of the make-alive may be relied upon to cause the make-alive to break down only when the holder is positive with respect to the mercury, and this dissymmetry may be enhanced by suitable means as described hereinafter in connection with Figs. 2 and 8, but we prefer to utilize some sort of auxiliary rectifying device for supplying the make-alive with potential only during the positive half-cycles of the alternating voltage impressed thereon. The voltage-drop in the auxiliary rectifier also helps to put out the make-alive arc as soon as the main arc strikes.

In Fig. 1, each make-alive rod 17 is energized by means of a hot-cathode rectifier 23 from its own main anode 6. In the particular system shown in this figure, the main anodes and tanks of all six rectifiers are bussed together on a common bus 24 which is connected to the grounded negative conductor of a direct-current load-circuit 25. The point in the cycle at which the make-alive rods receive enough current to initiate the arcs may be controlled by any suitable means, indicated diagrammatically in Fig. 1 as a rheostat 26 which is connected between the main-anode bus 24 and a make-alive anode bus 27. This rheostat 26 may also serve as a switch for open-circuiting all of the make-alive circuits, thereby causing all of the rectifiers to cease operating.

The alternating-current connections shown in Fig. 1 include a three-phase supply line 28 to which is connected the delta primary winding 29 of a transformer or transformer bank having a triple two-phase secondary winding 31. Thus, the primary winding 29 has three windings, and each of these windings is coupled to two secondary windings, or to a single secondary winding having a mid-point tap 32, the terminals of the secondary windings being connected to the cathode leads 13 of two of the vectrions or rectifiers. The three mid-points 32 of the secondary windings are connected to the terminals of a three-phase interphase transformer-means 33 having a neutral connection 34 which is connected to the positive conductor of the direct-current load-circuit 25.

The interphase transformer-means 33 has windings so disposed as to balance out the direct-current flux while keeping the currents in the three terminal phase-connections substantially equal to each other. As shown in Fig. 1, this is accomplished by winding the interphase transformer on a three-legged magnetizable core 35, one winding being on each leg.

Figs. 12 and 13 show typical voltage and current wave forms of one of the rectifiers or vectrions connected to one of the transformer windings of Fig. 1. The heavy line 36 in Fig. 12 shows the voltage from the anode to the cathode of one rectifier. The dotted line 37 in the same figure shows the voltage across the transformer winding. Fig. 13 shows the current entering the anode of the rectifier. When the current reaches zero, at the point 39, the voltage across the arc-space within the rectifier very quickly changes from a very low positive value, indicated by the point 40 in Fig. 12, to a negative value 41, thus very quickly applying a negative voltage to the main anode.

As shown in Fig. 14, the inverse or back current which flows across the arcing space immediately following the termination of the arcing period is relatively high; thus according to our theories, making the backfire-causes very frequent. Within a few micro-seconds with a low vapor-pressure, or within a hundred to a thousand micro-seconds with a higher vapor-pressure, the arcing space will develop the ability to withstand considerable voltage with a low probability of backfire, because of the material reduction in the inverse current, as indicated in Fig. 14.

In order to prevent a break-down during the transition period immediately following the termination of the arcing period, it is desirable to cause the negative voltage to build up slowly, in accordance with the dot-and-dash curve 42 in Fig. 12, or some similar curve, so that material voltages are not applied to the arcing space until the latter has had time to lose most of its ionization.

As shown in Fig. 1, the building up of a negative voltage on the main anode, relative to the main cathode,—or, what amounts to the same thing, the building up of the positive voltage on the main cathode relative to the main anode,—may be delayed to any extent desired by shunting each rectifier with an external circuit comprising a capacitor 44 of sufficient size. When this combination is used, the capacitor must be charged before an inverse voltage can be applied across the main anode and cathode, and the time required for this charging operation will be determined by the inductance normally present in the external circuit-connections of the rectifying arc or path, and the resistance of the capacitor circuit. Usually a small separate resistor 45 is connected in series with the capacitor 44, the same being desirable, in any case, in order to damp the circuit so as to prevent oscillation. In case the reactance in series with the rectifying arc is not sufficient, a small external reactor 46 may be utilized, the same having the property of saturating at a very low current, so as to offer a very low reactance for normal load currents during the arcing period.

The general theory of a delay in the application of a negative arc-voltage was set forth in a paper by the applicant Slepian, entitled "Extinction of an A. C. arc", which was read on June 29, 1928 at the Denver Convention of the American Institute of Electrical Engineers, a sufficiently full abridgement of which was published in the A. I. E. E. Journal for October, 1928, pages 706–707. (See Fig. 2 on page 707.)

The saturated reactor 46 is similar to a reactor which is described and claimed in an application of the applicant Slepian, Serial No. 548,719, filed July 4, 1931, for Backfire-preventing means for rectifiers, except that the present reactor 46 is not required to limit the reverse current to a fraction of an ampere for 50 micro-seconds or more, as in the Slepian application, the requirements of our present delaying circuit being much less severe.

In the small vectrion shown in Fig. 1, no special cooling means is provided for the cathode, as the losses in this device are extremely low, so that evaporation of the mercury could be relied upon to keep the cathode of the device sufficiently cool to prevent the starting of a discharge between the main cathode and the main anode during the non-arcing periods, which discharge, since it is a back current, would greatly increase the probability of backfire.

This will be more readily understood by reference to Fig. 15, which shows the voltage at which a discharge will start, in an un-ionized space filled with mercury vapor, plotted as a function of the product $pd$, where $p$ is the vapor-pressure in millimeters of mercury, and $d$ is the distance between electrodes in centimeters. The minimum starting voltage of something like 470 volts occurs when the product $pd$ is equal to about 6. The normal operating range of the rectifier is when the product $pd$ is somewhere around unity or less, so that the starting voltage is several thousand volts. The mercury vapor pressure is dependent, of course, upon the temperature. It is thus necessary for such temperature conditions to be maintained, with the spacings utilized, as to prevent the product $pd$ from materially exceeding some safe value such as unity, for example.

Figure 2:
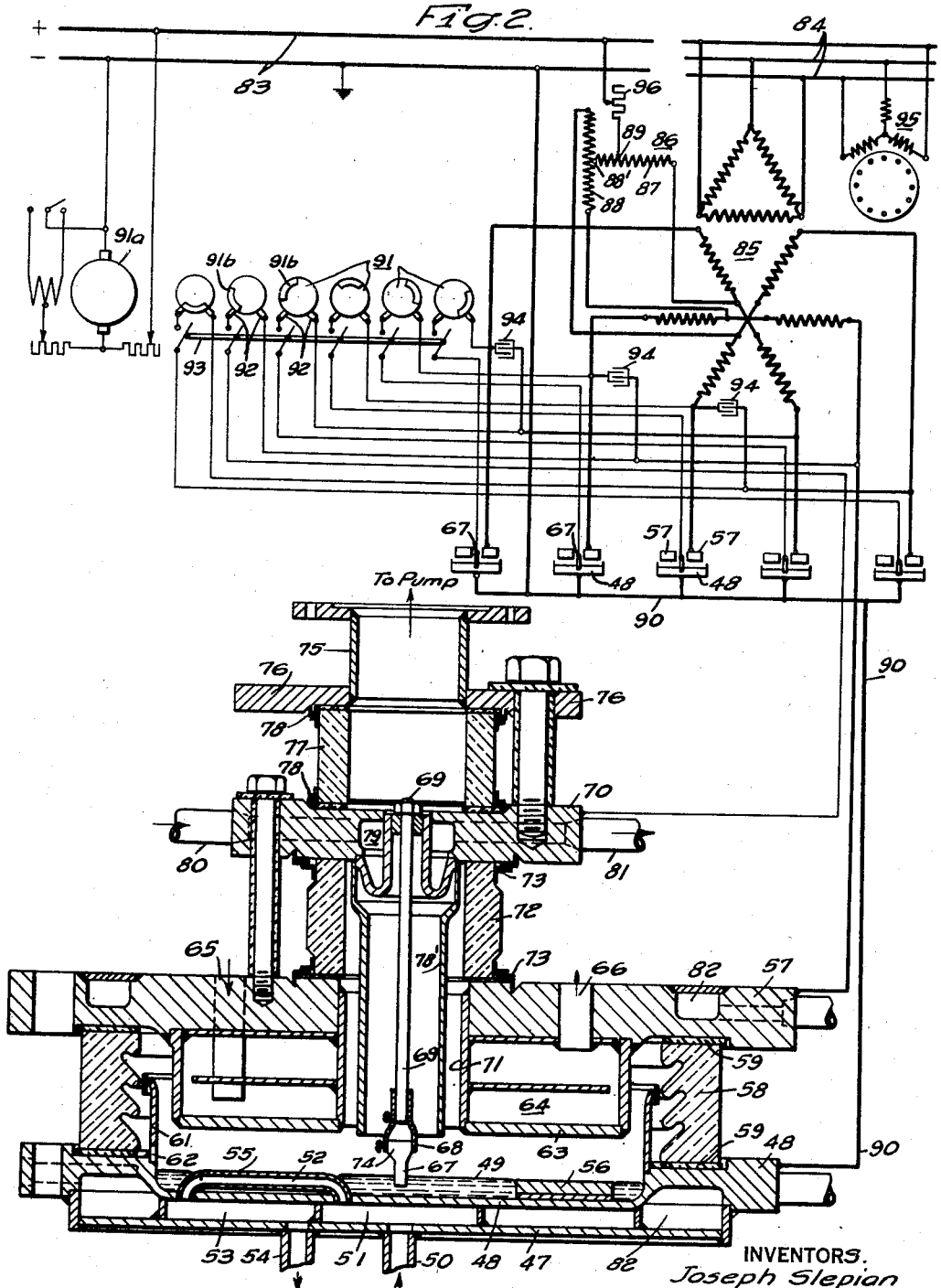
Fig. 2 is a diagram of circuits and apparatus showing another one of our preferred forms of vectrion, which we prefer in the larger sizes of apparatus, with a special inverter connection for supplying variable-frequency three-phase power from a direct-current line.

In the larger sizes of vectrions, such as that illustrated in Fig. 2, it is usually necessary or desirable to employ some positive means of cooling the cathode. At the same time, it is very desirable to use some sort of cathode-spot fixation means, which has the advantage of greatly reducing the intensity of the cathode blast, reducing the turbulence of the cathode, and limiting the quantity of vapor evaporated. This new feature, while of considerable advantage in the old types of multi-anode rectifiers, is particularly desirable in rectifiers in which the anode covers substantially the whole cathode and is spaced therefrom by a distance only sufficiently great for mechanical clearance to avoid the sputtering of liquid bridges across the space between the main anode and the cathode. It is further extremely desirable that such cathode-spot fixation means be very thoroughly cooled, particularly in our vectrion designs.

In accordance with the principles just explained, we have provided our vectrion as shown in Fig. 2 with a very efficient cathode cooling means and a water-cooled cathode-spot fixation means. Thus, a water-jacket 47 is provided underneath a metallic cathode receptacle 48 in which is disposed a quantity of liquid mercury 49 or other vaporizable reconstructing cathode-material. A cooling medium such as water which is as cold as possible enters through an intake pipe 50 into a central compartment 51 of the water-jacket, whence it is discharged through horizontal spot-fixation, cooling pipes 52 extending radially out from the center of a mercury pool, so that the tops of the pipes are about flush with the top surface of the mercury when the device is not in use. The water is discharged from the outer ends of these spot-fixation pipes 52 into an annular compartment 53 of the water-jacket, whence it is discharged through an outlet pipe 54.

At least the upper halves of the spot-fixation pipes 52 are electro-plated or covered by a sheet of suitable spot-fixation material 55, which, if in sheet form, is welded to the pipe so as to be in good thermal contact therewith, said spot-fixation material being molybdenum or tungsten or other non-sputtering material which is wet by mercury and prevents the burning of the pipe as a result of the arc.

The spot-fixation, cooling pipes 52 are placed sufficiently close together so that the calculated temperature of any point of the mercury surface except the cathode spot cannot become hotter than about 60° C. or possibly 80° C., and preferably it is very much less, possibly as low as 50° C. or lower. As the cathode-spot fixation pipes 52 extend radially, they are further apart at their outer ends than at their inner ends, and between their outer ends additional cooling means may be utilized in the form of solid metal lugs 56 which are welded onto the top of the metallic cathode receptacle 48, as shown in sectional elevation in Fig. 2 and in plan in Fig. 4.

The vectrion shown in Fig. 2 comprises an evacuated container having a bottom, a top, and side walls, said bottom being formed by the cathode receptacle 48 just described. The top is formed by a main anode plate 57, and the side walls are formed by an insulator ring or cathode porcelain bushing 58, which is clamped and hermetically sealed between the cathode receptacle 48 and the anode plate 57, utilizing any suitable seal as indicated at 59. In order to better enable the insulator ring 58 to function without becoming shorted over by liquid mercury or dirt particles, its inner wall is corrugated as shown, and is also protected by an annular guard or cylindrical vapor baffle 61 having a perforation 62 at its bottom for permitting liquid mercury to return to the cathode pool.

The active surface of the anode consists in the flat bottom plate 63 of a hollow protuberance 64 which extends down from the anode plate 57 and constitutes a cooling-jacket for the anode, air or other suitable cooling medium being introduced through an inlet pipe 65 and discharged through an outlet pipe 66. This downwardly projecting protuberance or anode cooling-jacket substantially fills the space within the baffle cylinder 61, so that the bottom plate or effective main-anode surface 63 is of substantially the same diameter as the top surface of the mercury cathode pool 49. The spacing between the main anode and the main cathode, in the particular design shown in Fig. 2, is one and one-quarter inches.

Since the cathode is strongly cooled in the design shown in Fig. 2, the vapor pressure is kept down by the cathode cooling-means, so that it is not necessary to rely upon the anode cooling-means for this purpose. Consequently the main anode in Fig. 2 can be operated at a higher temperature, say up to 300° C., and it is desirable to do this, probably on account of its effect in preventing the formation of nitrides or other deleterious substances upon the anode surface.

In the vectrion shown in Fig. 2, the make-alive anode is a short solid rod 67 of carborundum or other make-alive material previously mentioned, the same being carried by a holder 68 at the bottom end of a steel supporting rod 69 which is suspended from a make-alive-anode plate 70. The make-alive supporting rod 69 is centrally disposed and passes through a central opening 71 in the main anode plate 57. The make-alive-anode plate 70 is separated from the main-anode plate 57 by a tubular porcelain spacer 72 which is suitably sealed to both of the plates as indicated at 73. As in all of our make-alive designs, the make-alive rod 67 extends far enough into the mercury pool 49 to ensure that it is always in contact with the mercury, as otherwise its action would be faulty and it would be quickly burned away.

In Fig. 2, the upper end of the carborundum make-alive rod 67 is enlarged, as shown at 74, in order to increase the negative voltage necessary to form a cathode spot on the holder 68, without affecting the formation of a cathode spot on the mercury when the make-alive anode is positive, this effect at the holder being accomplished by reason of the increased cross-section, and hence lower resistance, of the make-alive rod at its upper end.

The central opening 71 in the main-anode plate 57 is made of generous dimensions to facilitate the removal of gases therethrough from the interior of the container. This is effected by a pumping connection 75 which is secured to a top flange 76 separated from the make-alive-anode plate 70 by another tubular porcelain spacer 77 which is also suitably sealed to the two plates at its top and bottom, as indicated at 78.

Although it is probably not altogether necessary in the design shown in Fig. 2, we have provided a tubular guard or shield 78' depending from the make-alive-anode plate 70 and extending down within the opening 71 in the main-anode plate 57, said tubular guard being of a diameter considerably larger than the make-alive rod 69. At the top of this tubular guard, we provide a water-jacket 79 which ensures that all of the mercury vapor is condensed before it reaches the pumping connection. A suitable cooling fluid is provided for the water-jacket 79 by inlet and outlet pipes 80 and 81.

In order to protect the seals 59 at the top and bottom of the insulating ring 58 between the main-anode plate 57 and the steel-cathode receptacle 48, we also preferably provide water passages 82 in the main-anode plate and in the cathode receptacle, as close to the seals as possible, in order to prevent the over-heating of the seals, as these seals are located at the hottest part of the container.

Fig. 2 shows an inverter system utilizing six vectrions such as that just described, to transfer power from a direct-current supply circuit 83 to a three-phase load circuit 84. The same triple two-phase transformer connection is shown as in Fig. 1, with some slight modifications. The terminals of the six-phase winding of the transformer 85 are connected to the main anodes 57, rather than to the cathodes as in Fig. 1.

The three neutral points of the secondary winding of the main transformer 85 in Fig. 2 are connected to a type of transformer 86 which has never before been utilized, so far as we are aware, as an interphase transformer, and which has advantages in utilizing only two windings, instead of three, and in utilizing only two cores instead of three as in the interconnected-star interphase transformer subsequently described in connection with Fig. 6.

The three-phase interphase transformer 83 of Fig. 2 consists of two separate single-phase auto-transformer cores having the windings 87 and 88, respectively, connected in the well-known Scott connection. That is, one winding, 87, is shorter than the other, having .866 times the number of turns of the other winding 88, and is connected to the midpoint 88' of the longer winding. A neutral tap 89 is connected to the short winding 87 at a point located 1/3 of the way from the midpoint-tap terminal 88'.

If the direct currents are balanced in the three terminals of the Scott-connected three-phase interphase transformer 86 just described, the direct-current magnetizations will neutralize each other, thus showing that the Scott transformer connection is suitable for use as an interphase transformer, which is a new use for it. Thus, in the longer winding 88, equal direct-currents are flowing in opposite directions in the two halves. In the short winding 87, the direct-current in the 1/3 branch is just twice the direct-current in the 2/3 branch, and opposite in direction, thus effecting a neutralization of the direct-current magnetomotive forces.

The neutral-point connection 89 of the interphase transformer is connected to the positive conductor of the direct-current circuit 83, in order to receive power from the direct-current circuit, instead of being connected to the negative conductor so as to transfer power to the direct-current circuit as in the rectifier connection of Fig. 1.

In Fig. 2, the six cathodes 48 are permanently connected together to a cathode bus 90 which is, in turn, connected to the grounded negative conductor of the direct-current circuit 83, so that all of the cathode receptacles 48, which constitute the bottoms of our vectrion tanks, are at ground potential, thereby considerably facilitating the mounting problem.

In Fig. 2, the six make-alive anodes 67 are energized, from their respective main-anode leads, by means of six mechanically driven commutator rings 91 which may be driven from a variable-speed and reversible motor 91a energized from the direct-current line. Each of the commutator rings 91 has one conducting segment 91b, the successive segments being displaced 60 degrees from each other. Two brushes 92 bear on each commutator ring, one brush of each pair being connected to one of the make-alive anodes 67 and the other brush of the same pair being connected to the corresponding main-anode lead. A six-pole switch 93 is provided in the make-alive-anode connections, whereby the main arc circuits of the vectrions may be interrupted, without necessitating the use of heavy-duty switches.

In order to provide the negative voltage-impulse necessary to cause the termination of the arcing period of the several main anodes 57, we provide any suitable capacitor means such as three capacitors 94 connected across the three pairs of diametrically opposite terminals of the six-phase transformer windings, as set forth in the Chubb Reissue Patent No. 17,693, granted June 3, 1930 and assigned to the Westinghouse Electric and Manufacturing Company.

The inverter system shown in Fig. 2 may conveniently be utilized to supply variable-frequency power to an induction motor 95 which derives its power from the three-phase alternating-current circuit 84 which is energized by the inverter. The frequency and direction of phase rotation may be controlled by means of the direct-current motor 91a. Generally, also, some sort of means for varying the voltage of the three-phase motor 95, particularly at starting, will be desired, and such means is generically indicated by means of a variable resistor 96 in the positive supply-lead of the inverter.

In Figs. 1 and 2, our invention has been shown in connection with evacuated tanks having asymmetrically conducting vapor-arcs therein, for use as a rectifier or an inverter, respectively.

In Fig. 3, we show our invention as applied to an open-air arc-device 97 which may be used in general switching problems, or, as shown, in the particular switching problem which is involved in discharging a lightning surge from an alternating-current line, and extinguishing the power arc following the same.

The arc device 97 in Fig. 3 consists of two brass electrodes 98 mounted in the ends of a long fiber tube 99. The fiber tube and preferably also at least one of the electrodes 98 are provided with many perforations 100 for the purpose of relieving the gas-pressure when an arc occurs. A make-alive device is provided for each of the electrodes 98, the same comprising, preferably, two short rods 101 of make-alive material, such as has been previously described. In Fig. 3, these make-alive rods 101 are illustrated as comprising crystals of carborundum. Each make-alive rod or crystal has one end immersed in one of the brass electrodes 98 which is molded therearound, the other end of the rod being held or immersed in a small brass holder 102 having a terminal connection 103 passing through an insulating bushing 104 in the side of the fiber tube 99. The terminal connections 103 of the two make-alive rods are joined through an external resistor 105. One end of the arc device 97 is grounded as indicated at 106 and the other end is connected, through a suitable spark-gap device 107, to an alternating-current line-conductor 108 which is to be protected against excessive voltages, the same being illustrated by way of example, as 11,000-volt, 60-cycle line. The spark-gap device 107 is shown as being a multiple series gap with shunting resistors 108'.

When an excessive voltage appears on the line 108, the spark-gap 107 sparks over and applies the excessive line voltage to the arc device 97. The resistance 105 is of such value that it permits the flow of whatever current is necessary to cause a cathode-spot to be formed at the point of emergence of the carborundum crystal from whichever brass plate 98 happens to be negative at the moment. Thus, if the make-alive device starts at a current of 2 amperes, and the normal line voltage is 11 kilovolts, it may be assumed that the spark-gap 107 will arc over at double line voltage, and the resistance 105 would have a value of about 11,000 ohms.

As soon as the make-alive crystal operates to form a cathode-spot, an arc is produced within the fiber tube 99, extending from one terminal electrode 98 to the other. These electrodes are spaced at a sufficient distance apart so that the arc which is struck between them will surely go out and not of itself restrike at the end of the half-cycle in which the arc was struck, at the normal line voltage for which the device is designed, in this case 11,000 volts. Under the heat of the arc decomposition of the fiber of the tube 99 takes place, which causes so strong a blast of gas to be driven through the arc that the arc is extinguished with electrode-separations very much less than those which would be necessary in the open air. When we speak of the electrode-separation being sufficiently great to prevent restriking, we mean that it is sufficiently great, under such deionizing influences as may be present, to prevent restriking. Heretofore it has not been feasible to strike an arc in the midst of strong deionizing influences. It has been necessary to strike the arc at a point which is largely outside of the deionizing influences, and then to attempt to transfer the arc to a point which is within such strong deionizing influences as will ensure the more or less prompt extinguishment of the arc.

In Figs. 4 and 5 is shown a modification of the vectrion construction utilized in Fig. 2. The principal feature of this modified construction, which is one of our early vectrion constructions, is the fact that we utilize a keep-alive arc which is playing all of the time, in the container, but which is so thoroughly shielded that the back-current to the main anode during the non-arcing period is sufficiently low to reduce the frequency of backfires to a value which is tolerable for some applications of a vectrion, as a rectifier, inverter or switch. As only one main anode is utilized in each tank and as the keep-alive arc is very thoroughly shielded, there is no really open arc playing in the device during the non-arcing periods.

In the rectifier shown in Fig. 5, the keep-alive anode 109 is a small tungsten rod which barely dips into the top of the mercury cathode surface 49, and which is supported from the bottom of a supporting rod 110, similar to the rod 69 in Fig. 2, except that, in this case, provision must be made for the vertical adjustment of the supporting rod, because the tungsten keep-alive anode 109 is very sensitive as to the small amount by which it may dip into the mercury. This vertical adjustment is provided by means of a bell-crank lever 111, one arm of which supports the supporting rod 110, and the other arm of which may be adjustable horizontally by means of a rod 112 extending through a sylphon bellows 113, which is pushed in or out by means of adjusting-nuts 114. The sylphon bellows prevents the loss of vacuum, while providing for a small amount of movement.

In Fig. 5, the keep-alive-anode plate 115 which supports the top of the supporting rod 110 through the vertically adjusting means just described, is separate from the plate 116 which supports the tubular shield 117 surrounding the keep-alive device, the two plates 115 and 116 being separated by a tubular porcelain insulator 118 suitably sealed thereto. As the keep-alive arc is playing all the time, it is necessary for the tubular shield 117 in Fig. 5 to extend down very close to the mercury surface, within one-eighth of an inch thereof in the design illustrated. It is also provided with a disc-like bottom member 119 having an opening 120 through which the tungsten rod 109 extends. The plate 116 which supports this keep-alive shield 117 is shown as being provided with a terminal connection 121 which we sometimes utilize in the treating-out process to produce an arc between the bottom of the shield 117 and the mercury 49.

The keep-alive-anode plate 115 is provided with a keep-alive-anode terminal 122, and current is carried from this plate to the keep-alive supporting rod 110 by means of a pigtail or jumper 123.

As indicated in the electrical connections shown in Fig. 5, current is supplied to the keep-alive-anode terminal 122 from the positive end of a direct-current source such as a battery 124, through a suitable ballast resistance 125, the negative end of the battery being connected to the cathode receptacle 48. The main anode 57 is energized from an alternating-current supply circuit 126 and the cathode 48 supplies current to the positive conductor of a direct-current load circuit 127, the negative conductor of which is connected to the mid-point of a transformer 128 on the alternating-current circuit.

The tungsten keep-alive rod 109 in Fig. 5 is held so as to make a slight contact with the mercury, so that, when the main arc is out, the cathode of the keep-alive arc will always be immediately adjacent to the tungsten rod and therefore under the shield.

In Fig. 6, we have shown a form of embodiment of our vectrion which appears to have many advantages from a manufacturing standpoint, and which illustrates certain variations in the design. In this design, the principal cooling of the space within the vectrion is effected by means of a water-cooled baffle which separates the main anode from the main cathode and serves in a large measure to make it unnecessary to adopt special delaying circuits for avoiding backfires during the transition period. This design also utilizes more nearly standard constructions of the main anode and of the main cathode.

Referring to Fig. 6 in detail, our vectrion, as there illustrated, consists of an evacuated tank having a water-jacketed tubular side wall 130 having detachably secured thereto a top main-anode plate 131 and a bottom cathode assembly 132, utilizing, for the joining means, rubber gaskets 133 or other readily detachable, hermetical sealing means. As these seals operate in relatively cool portions of the tank, no difficulty is experienced in making them readily detachable.

The main-anode plate 131 at the top of the tank supports a steel main-anode head 134 which depends into the interior of the tank and is insulatedly supported from the main-anode plate by an anode porcelain insulator-mounting 135 such as has been developed to a high stage of perfection in connection with conventional forms of metal-tank mercury-arc rectifiers. The anode-head 134 is supported by an anode lead-rod 136, the top portion of which may carry radiator fins 137 for cooling the anode head, as in conventional rectifier designs. The anode porcelain 135 is hermetically sealed to the anode plate 131 by means of a permanent soldered seal 138 of a design which has become standard in the previously constructed multi-anode rectifier tanks of the Westinghouse Electric and Manufacturing Company.

The cathode assembly 132 in Fig. 6 comprises a top flange 140 which is detachably but not insulatedly connected to the tubular wall portion 130 of the tank by means of the rubber-gasket seal 133 previously mentioned. A steel cathode receptacle 141 is provided for the cathode assembly, the same being separated from the top flange 140 by means of a tubular cathode porcelain 142 which is permanently sealed to the top flange 140 and to the cathode receptacle 141 by means of non-detachable soldered seals 143. The top flange 140 and the cathode receptacle have overlapping, but non-touching, ring-like projections 144 and 145, respectively, which serve to protect the the cathode porcelain 142 from much of the direct heat of the arc. A pool of mercury or other cathode material 146 is disposed in the bottom of the cathode receptacle. We also provide a cathode shield in the form of a quartz cylinder 147 which is clamped in position around the edge of the mercury pool by means of a spring clamp 148 in the bottom of the pool, pressing the quartz cylinder up against a steel clamping ring or guard ring 149 carried by the top flange 140. The cathode assembly is completed by a water-jacket 150 underneath the cathode pool.

The make-alive anode in Fig. 6 comprises a carborundum rod 151 held in an iron terminal holder or clamp 152.

The make-alive holder 152 is supported from the end of a stiff supporting rod 153 which may be of steel, said supporting rod passing through a long quartz sleeve or other tubular insulator 154 which, in turn, passes through a perforation in the side wall 130 of the tank, said perforation being surrounded by an iron tube 155, welded in place so as to constitute a part of the tank. The iron tube 155 terminates in a flange 156 which is hermetically and insulatedly attached to a similar flange 157 which is connected to the end of the supporting rod 153, the connection between the two flanges comprising a porcelain insulating ring 158 and rubber-gasket seals 159 or their equivalents at the ends of the porcelain ring.

The vectrion shown in Fig. 6 is also provided with a water-cooled baffle 160 which is suspended from the anode plate 131 by means of the two pipes 161 and 162 by which water is lead into and out of the baffle, the baffle being of hollow construction. By this construction, a large amount of the power-loss in the rectifier, which appears as heat, is withdrawn by the baffle, so that the requirements for cooling the main anode and the cathode are less severe. Furthermore, by reason of the interposition of the water-cooled baffle between the main anode and the cathode, the cathode is protected from the heat radiated from the anode, in case the latter should run too hot on overload, the baffle presents a relatively large surface for more quickly deionizing the arc space, and the main anode is protected from direct exposure to the cathode-spots on the cathode or to the mercury-vapor blast emanating therefrom, thereby rendering the device much less subject to backfires during the difficult transition period heretofore mentioned.

The circuit connections shown in Fig. 6 illustrate a different kind of interphase transformer and a slightly different form of control means for the make-alive anodes 151. In this circuit, all six of the cathodes 141 are joined together to a cathode bus 163 which is connected to the positive conductor of the direct-current load-circuit 164. The six anode-heads 134 are connected to the six-phase terminals of the transformer 165.

The three neutral points of the main transformer 165 in Fig. 6 are connected to a three-phase interphase transformer 165' consisting of three separate single-phase transformer cores each having two windings connected in the well-known interconnected-star connection. In the diagram, the interphase-transformer windings which are wound on the same core are shown, in each case, as being parallel to each other. The neutral point of the interconnected-star interphase transformer 165' is connected to the negative conductor of the direct-current load-circuit 164.

The make-alive anodes 151 in Fig. 6 are connected to their respective anode-leads 136 through small three-element rectifier tubes 166 which are provided with grids 167, the tubes being what are known as positive-control tubes, needing about 30 volts positive bias in order to make the arc strike between the plate or anode 168 and the filamentary cathode 169.

The biasing voltage applied to the grids 167 of the small rectifier tubes in the make-alive circuits is applied by means of a variable direct-current source such as a battery 170 which is connected between the main-cathode bus 163 and a grid-control bus 171, the voltage being variable from, say, about 30 volts positive to about 30 volts negative, applied to the grid-control bus 171 with reference to the main-cathode bus 163 of the vectrions. The controlling grid 167 of the small make-alive-circuit rectifier of each vectrion is energized from the secondary winding 172 of a small transformer 173, the primary winding 174 of which is energized from the next leading phase of the six-phase windings of the transformer 165, each of the secondary windings 172 being connected between its grid 167 and the grid-control bus 171. As the grid-control currents are of the order of milli-amperes, the six transformers 173 are of very small size indeed, having a capacity less than that of a bell-ringing transformer.

The operation of the grid-control circuits is illustrated in connection with Figs. 16, 17, and 18 in which the horizontal line 175 represents the biasing voltage (with respect to cathode) necessary to be applied to the auxiliary rectifier tubes 166 before they will begin to rectify and supply current to the irrespective make-alive anodes 151. The portions of alternating voltages applied to the main anodes 136 (Fig. 6), where these voltages are positive with respect to the cathode bus, are shown by the full-line curves 176 in Figs. 16 to 18. The voltage developed in the secondary winding 172 of the small grid transformer 173 is represented by the dotted-line sinusoidal curve 177 having, for its base line, the voltage of the biasing battery 170, as represented by the dotted horizontal line 178. By changing the value of the biasing-battery voltage 178 from maximum positive potential, as shown in Fig. 16, to zero as shown in Fig. 17, and finally to maximum negative potential as shown in Fig. 18, the point at which the grid-voltage, represented by the displaced sinusoidal curve 177, crosses the horizontal line 175 representing the voltage necessary to be applied to the grid 167 before its auxiliary rectifier tube 166 will operate, is retarded more and more, as indicated by the points 181, 182, and 183 in Figs. 16, 17, and 18, respectively, so that the arc between the main anode 136 (Fig. 6) and the cathode 141 of the several vectrions is struck later and later in the half-cycle in which the main anode is positive, thereby reducing the power transferred to the direct-current load-circuit 164 (Fig. 6), as indicated by the shaded areas in Figs. 16, 17, and 18. In this manner, we may vary the voltage of the direct-current load-circuit 164, or if this is fixed by the load itself, we may change only the power delivered to the load by the rectifier assembly.

Fig. 7 illustrates a circuit arrangement for utilizing our single-anode vectrions whereby power may be transferred, in either direction, between an alternating-current circuit 184 and a direct-current circuit 185. In this system, two vectrions 186 and 187 are utilized, having their main anodes 188 and 189 permanently connected to the two conductors of the single-phase circuit 184, and having their cathodes 190 and 191 connected to a common cathode bus 192. The make-alive anodes 193 and 194 of the two vectrions are connected to their respective main anodes by means of rotating commutator devices 195 and 196 comprising brushes 197 mounted in a rotatably adjustable brush-holder 198, said brushes bearing upon a rotating commutator device driven by a synchronous motor 199 having its primary winding 200 energized from the alternating current line 184. The primary winding 200 may be provided with a mid-tap which is connected to a bus 202.

The cathode bus 192 and the mid-tap bus 202 are connected respectively to the positive and negative conductors of the direct-current circuit 185 for rectifier operation, the connections being reversed, for inverter operation, the reversal being effected by means of a commutator or reversing switch 203. At the same time that the reversing switch is reversed, the adjustable brush holder 198 must be shifted through approximately 180 degrees so that the make-alives are energized to make the main arc play over a half-cycle in which the average impressed voltage is negative rather than positive. The adjustable brush-holder 198 also affords a means for varying the point in the cycle at which the make-alives are energized. To make possible the inverter operation, it is usually necessary to utilize a capacitor 204 connected between the two main-anode leads, for the purpose of giving the negative kick necessary to terminate the successive arcing periods.

In Fig. 8, we have shown another vectrion circuit in which power may be transferred in either direction between an alternating-current circuit 184 and a direct-current circuit 185, but wherein it is not necessary to use any switches whatever in the main current circuits. For this purpose, we utilize two double-ended vectrions 205 and 206 each of which consists of an inverted U-shaped tube having two mercury pools 207 and 208, each pool being provided with a make-alive anode 209. By energizing the one or the other of the two make-alive anodes of each vectrion, it is possible to make either one of the two mercury pools 207 and 208 a cathode, the other pool operating as an anode without a cathode-spot thereon.

The two mercury pools marked 208 of the two vectrions in Fig. 8 are energized across the terminals of the alternating-current circuit 184, being either directly connected thereto or energized by means of the secondary winding 210 of a transformer 211. The two mercury pools marked 207 in the two vectrions are connected together and are connected either to the positive or to the negative conductor of the direct-current circuit 185, the other conductor of the direct-current circuit being connected to a mid-point tap 212 of the transformer secondary winding 210. As shown in Fig. 8, the two mercury pools 207 are connected to the negative conductor of the direct-current circuit, and the circuits for energizing the four make-alive anodes 209 will be explained with this connection in view.

A change from rectifier to inverter action in Fig. 8 is effected by means of a small double-throw switch 213 which has to carry only the small control currents of the make-alive anodes 209. When the double-throw switch is in its upper position, the two vectrions operate as a rectifier, the mid-point tap 212 of the transformer secondary winding 210 being connected to the make-alive anodes dipping into the two mercury pools 208, in series with current-limiting resistors 214 which ensure that the make-alive anodes receive enough current to form a cathode-spot at the surface of either mercury pool designated by the numeral 208 when the pool is negative with respect to the make-alive anode, without forming a cathode-spot on the make-alive-anode holder 215 when the latter is negative with respect to the corresponding cathode 208. This is possible, as previously explained, because of the difference in current at which a cathode-spot is formed on the solid metal holder as compared to the mercury cathode pool, and this difference of current may be still further increased by the use of insulating shields 216 near the junction of the make-alive anode-rod 209 and its holder 215.

When the double-throw switch 213 is moved to its lower position, the two make-alive anodes 209 which are associated with the two mercury pools 207 are connected through two pairs of commutator brushes 217 and 218, respectively, to the alternating-current terminals, or to the terminals of the secondary winding 210 or any equivalent energizing means for receiving current from the alternating-current circuit 184. The commutator device in this case consists of a single commutator cylinder 219 having a single conducting segment 220, the two brushes of each pair 217 or 218 being mounted either in axial alignment with each other or displaced by only a short distance circumferentially, as shown, for the sake of clearness, in the drawings. The commutator is driven from a synchronous motor 221 energized from the alternating-current line. According to this connection, the mercury pools 207 are caused to be cathodes by the formation of cathode-spots thereon at the points of emergence of the make-alive anodes dipping therein, whereas the mercury pools 208 are not so activated and, therefore, operate only as anodes, permitting current to flow only in the direction in which power is supplied from the direct-current line 184 to the alternating-current line 185.

In Fig. 9, our vectrion is shown as having a glass container 222 having a cathode mercury pool 223 and a cathode lead 224 in its bottom, a graphite main anode 225 and a main-anode lead 226 in its top, a small carborundum make-alive rod 227 dipping into the mercury and supported from a holder 228 at the end of a stiff make-alive lead-rod 229 which is shielded by a quartz tube 230 and which extends through a seal 231 in the side of the glass vessel. The vectrion is also provided with an iron baffle-disc 232 which is supported by a rod 233 held in a seal 234 on the other side of the tube. The baffle-disc 232 is disposed between the main anode 225 and the cathode 223 and it performs the same function as the previously described baffle 160 in Fig. 6 except that the water-cooling function is omitted in Fig. 9.

The make-alive circuit control system as shown in Fig. 9 is slightly different from the control systems previously illustrated. A small auxiliary rectifier 235 is utilized for energizing the make-alive anode 227, but instead of being connected directly in the make-alive-anode circuit, it is connected in series with the primary winding 236 of a small auxiliary transformer 237, the secondary winding of which is connected between the make-alive anode 227 and the negative conductor of the direct-current load-circuit 238. In this way, the make-alive anode is given the necessary starting impulse only during the period when the main anode 225 should be the terminal of a main current-conducting arc between said main anode and the cathode 223.

In Fig. 9, we have illustrated the fact that the make-alive device need not be energized directly from the main cathode circuit but may be energized through an auxiliary transformer-winding which is indicated at 239, whereby the current and voltage conditions best adapted for the make-alive operation may be readily selected.

Our improved make-alive device is not limited, in its application, to single-anode tubes or tanks, in the field of rectifiers and inverters. It is a very great improvement if used in place of the usual starting-anode means in a conventional multi-anode rectifier tank, as illustrated in Fig. 10, wherein an iron rectifier tank 240 contains a mercury cathode 241 and six main anodes 242 of a design which was conventional prior to our invention, the showing in Fig. 10 being purely diagrammatic, without any effort to show the details of construction of this old form of tank. To start the operation of such a tank, it has been necessary, heretofore, to provide a movable starting anode and to provide means outside of the tank for moving the starting anode inside of the tank, and the starting anode has required a special source of voltage and special resistors and other control-equipment.

In Fig. 10, we have dispensed with the usual starting anode and have substituted one of our make-alive anodes 243 which is connected through a small external rectifier 244 to any one of the six anode leads 242. With this arrangement, all that is necessary to start the rectifier is to close a switch such as the switch 245 connecting the rectifier to its load-circuit 246. Thereupon, at the beginning of the first conducting period of the main anode to which the make-alive anode is connected, the make-alive anode will become energized and start up the main rectifier. As soon as the rectifier starts, the make-alive arc which is in series with the external auxiliary rectifier 244, the whole being shunted by the main arc in the rectifier tank, goes out because the make-alive circuit requires more voltage than the voltage across the main arc. Thereafter, throughout the entire operation of the main rectifier, the make-alive anode remains inoperative, its sole function being to initiate the operation of the rectifier as soon as the main-current circuits are closed, no control-switches being necessary.

Fig. 10 shows also a conventional rectifier-transformer connection which is applicable, of course, to our single-anode vectrions, although we prefer the triple two-phase connections previously shown and described. In Fig. 10, a double-star connection is shown, involving a transformer 247 having a delta-connected primary winding 248 and a six-phase secondary winding 249 which is connected in two three-phase Y-connections providing two neutral points 250 and 251 which are connected to the terminals of a single-phase interphase transformer 252 having a mid-point which is connected, through one pole of the switch 245, to the negative conductor of the direct-current load-circuit 246.

In the foregoing specification, and in the appended claims, when we speak of an alternating-current line or a direct-current line, we refer, in general, to the terminals or conductors for carrying alternating current or direct current, respectively, regardless of whether said terminals are connected to a source of power, to a consumer of power, or to a distribution line having both a source and a consumer connected to it.

While we have illustrated several forms of embodiment and several applications of our invention and of the various features cooperating therewith, it will be obvious that many changes in design and many other applications of the same may be made within the spirit of our invention. We desire, therefore, that the illustrative and descriptive matter contained in this specification and in the accompanying drawings shall be regarded as being illustrative rather than as limiting us to the particular designs and uses shown, and that the appended claims be accorded the broadest interpretation consistent with their language and the prior art.

We claim as our invention:

1. An alternating-current arcing device comprising two fixed main electrodes so far separated, with reference to the deionizing influences present, that an arc, if struck between them, will surely go out and not of itself restrike at the end of the half-cycle in which the arc was struck, at the expected arcing voltage under which the device is designed to operate, and striking means for forming a cathode spot on one of said main electrodes to cause the latter to become the cathode electrode of an arc between the two main electrodes, said striking means comprising a poorly conducting material having one end permanently contacting with said cathode electrode, and means for energizing the other end from the energy supplied to the two main electrodes so that said material becomes an auxiliary anode of sufficient positive potential to form a cathode spot at the junction point between its surface and the surface of the cathode electrode during the half-cycle in which the arc is to be struck between the main anodes, said material being capable of withstanding a sufficient current-density at said junction point to produce the necessary cathode-spot-generating voltage-gradient at said point without destroying said material.

2. A make-alive device comprising a cathode, and a make-alive anode permanently immersed in said cathode, at least a portion of said make-alive anode having a resistivity at least about a hundred-fold greater than the resistivity of said cathode, said make-alive anode being a material capable of withstanding the temperature of a cathode spot at its point of emergence from the cathode.

3. A vapor-arc device comprising two spaced main electrodes and a short rod of a resistivity of the order of from about $10^{-2}$ to about $10^{+5}$ ohms per centimeter cube having one end contacting with one of said main electrodes and an insulatedly mounted holder for the other end thereof.

4. An arcing device comprising two spaced electrodes between which an arc is to be struck, and a make-alive rod having a portion at least of such resistivity and dimensions that the resistance along the path of current-flow is of the order of from about $10^{-2}$ to $10^{+5}$ ohms per centimeter of length, said make-alive rod having one end contacting with one of said two spaced electrodes, and an insulatedly mounted holder for the other end thereof.

5. An arcing device comprising two main electrodes, terminal connections therefor, a make-alive device for starting an arc between said main electrodes, said make-alive device being in engagement with one of the main electrodes that portion of the device in engagement with the main electrode consisting at least in part of poorly conducting material, a separate terminal for said make-alive device, and a unidirectional conductor for applying make-alive potential thereto.

6. An arcing device comprising two spaced electrodes between which an arc is to be struck, and a make-alive device therefor, said make-alive device having a portion of poorly conducting material contacting with one of said electrodes which is to become the cathode of the arc, said portion being of such electrical and geometric characteristics as to produce a gradient of 100 volts per inch along it without prohibitively large current.

7. A vapor-arc asymmetrically conducting device for use on an alternating-current circuit, comprising a vaporizable reconstructing cathode and main anode means associated therewith, characterized by having a stationary short make-alive rod of poorly conducting material having one end contacting at all times with said cathode for forming a cathode spot thereon, a holder for the other end of said rod and means for applying intermittent, unidirectional energy-impulses to said rod only during the positive half-cycles of said alternating-current circuit.

8. A make-alive device comprising a rod of heat-resistant, poorly conducting material, and terminal electrodes of dissimilar materials in permanent contact with the respective ends thereof, whereby a cathode spot is formed at the junction-surface of said rod and one of said terminal electrodes, when this terminal electrode is negative, at a smaller current in the make-alive device than is required to form a cathode spot at the junction-surface of said rod and the other of said terminal electrodes, when the latter is negative, an alternating-current energizing circuit, and means for so energizing the device from said circuit that said device does not receive sufficient energy to form a cathode spot on the last-mentioned terminal electrode.

9. An asymmetrically conducting vapor-arc device comprising an evacuated container having two, and only two, operating main electrodes therein and having a poorly conducting auxiliary starting electrode therein extending down into permanent contact with one of said operating main electrodes, the operative portion of at least the last-mentioned one of said main electrodes including a vaporizable reconstructing cathode-material, and external circuit connection means including an auxiliary rectifier connected between said auxiliary starting electrode and the other main electrode.

10. An asymmetrically conducting vapor-arc device comprising an evacuated container having two, and only two, operating main electrodes therein and having an auxiliary starting electrode of high resistance material in contact with one of said main electrodes, said operating main electrodes being an anode and a cathode, respectively, the operative portion of at least the cathode main electrode including a vaporizable reconstructing cathode-material, and external circuit connection means including an auxiliary rectifier having its cathode connected to said auxiliary starting electrode and including an alternating-current circuit means connected between the anode of the auxiliary rectifier and the anode main electrode for supplying intermittent, unidirectional power to said auxiliary starting electrode so as to effect the periodic initiation of the conducting periods in said vapor-arc translating device.

11. An asymmetrically conducting vapor-arc translating device for transferring power between an alternating-current circuit and a direct-current circuit, said device comprising an evacuated container having two, and only two, operating main electrodes therein and having an auxiliary starting electrode of high resistance material in contact with one of the main electrodes, one of said operating main electrodes being lower than the other, the operative portion of at least the lower one of said main electrodes including a vaporizable reconstructing cathode-material, means for causing the voltage between said operating main electrodes to be positive, at least during arcing periods of said vapor-arc device, means for periodically reversing said voltage whereby the arc between said operating main electrodes is extinguished at the end of each arcing period, and external circuit connection means including an auxiliary rectifier connected between said auxiliary starting electrode and the upper main electrode, whereby intermittent, unidirectional currents flow through said auxiliary rectifier to the auxiliary starting electrode of the vapor-arc device to initiate the successive conducting periods thereof, and means for discontinuing said intermittent, unidirectional currents for stopping the operation of the vapor-arc device.

12. A vapor-arc device comprising a liquid cathode, and an anode between which an arc is to be struck, and a stationary make-alive anode extending down with its bottom end immersed in said liquid cathode, said make-alive anode having a resistivity of the order of from about 2 to $10^{+5}$ ohms per centimeter cube.

13. A vapor-arc device comprising a liquid cathode, and an anode between which an arc is to be struck, and a stationary make-alive anode extending down with its bottom end immersed in said liquid cathode, said make-alive anode having a resistivity of the order of from about 2 to $10^{+5}$ ohms per centimeter of length.

14. A vapor-arc device comprising a cathode, a main anode, and a carborundum make-alive anode permanently contacting with only the cathode.

15. A vapor-arc device comprising a cathode, a main anode, and a make-alive anode engaging the cathode, said make-alive anode comprising a rod composed of carborundum, lampblack, and a clay binder.

16. A vapor-arc device comprising a cathode, a main anode, and a make-alive anode engaging the cathode, said make-alive anode comprising a rod composed of carborundum, lampblack, and a binder which emits substantially no gas or vapors when heated under operating conditions.

17. An asymmetrically conducting vapor-arc device comprising an evacuated container, a cathode of vaporizable reconstructing material within said container, a single main anode within said container, two circuit conductors for said cathode and said main anode, respectively, whereby alternating-current voltages are applied to said main electrodes but substantial currents are conducted in only one direction through the vapor-arc device, and make-alive means including an auxiliary starting anode in contact with said cathode, and external circuit connections including an auxiliary rectifier responsive to the polarity of the voltage applied to the main anode for applying power to said auxiliary starting anode.

18. A vapor-arc asymmetrically conducting device for use on an alternating-current circuit, comprising a container, a vaporizable reconstructing cathode and a single main anode therein, an intermittently arcing make-alive device therein comprising a rod of poorly conducting material in contact with the cathode for initiating a main arc between the cathode and the main anode at the beginning of each arcing period of the device, and energizing means for varying the point in the cycle at which said main arc is initiated.

19. A vapor-arc rectifier for transferring power from an alternating-current circuit to a direct-current circuit, comprising a container, a vaporizable reconstructing cathode and a single main anode therein, an intermittently arcing make-alive device therein for initiating a main arc between the cathode and the main anode at the beginning of each arcing period of the device, said make-alive device comprising a poorly conducting rod having one end permanently contacting with said cathode, and means for energizing the other end of said rod from the alternating-current energy supplied to the main anode so that said rod becomes an auxiliary anode of sufficient positive potential to form a cathode spot at the junction point between its surface and the surface of the cathode at the beginning of each arcing period of the device, said energizing means comprising means for varying the point in the cycle at which said main arc is initiated.

20. Means for translating power between a three-phase line and a direct-current line, comprising six vapor-arc asymmetrically conducting devices having one common bus terminal and six cathode lead terminals, each vapor-arc device comprising an evacuated container composed substantially entirely of metal, all portions of said metal being in electrical contact with each other, an insulating cathode receptacle disposed in the bottom of said container, a main cathode in said insulating cathode receptacle, a main anode formed on the top wall of said container, there being no other main electrodes in said container, the operative portion of at least the cathode including a vaporizable reconstructing cathode-material, and means for periodically forming a cathode spot on said cathode, said means being of a type which supplies substantially no ions or electrons to the space between said cathode and said main anode during non-arcing periods, the six metal containers being connected to said common bus terminal, the six cathodes being connected respectively to the six cathode lead terminals, transformer means comprising three windings connected to said three-phase line, a separate coupled winding in inductive relation to each of said three first-mentioned windings, respectively, each coupled winding being connected between two of said cathode lead terminals and having a midpoint tap, and a three-phase interphase transformer means having three terminal phase connections joined to the three midpoint taps, respectively, and having a neutral connection, said interphase transformer means having windings so disposed as to balance out the direct-current flux while keeping the currents in the three terminal phase connections substantially equal to each other, the direct-current line being connected between the interphase neutral connection and the common bus terminal of the vapor-arc devices.

21. Rectifier means for translating power from a three-phase line to a grounded-negative direct-current line, comprising six vapor-arc asymmetrically conducting devices having one common bus terminal and six cathode lead terminals, each vapor-arc device comprising an evacuated container composed substantially entirely of metal, all portions of said metal being in electrical contact with each other, an insulating cathode receptacle disposed in the bottom of said container, a main cathode in said insulating cathode receptacle, a main anode formed on the top wall of said container, there being no other main electrodes in said container, the operative portion of at least the cathode including a vaporizable reconstructing cathode-material, and means for periodically forming a cathode spot on said cathode, said means being of a type which supplies substantially no ions or electrons to the space between said cathode and said main anode during non-arcing periods, the six metal containers being connected to said common bus terminal, the six cathodes being connected respectively to the six cathode lead terminals, transformer means comprising three windings connected to said three-phase line, a separate coupled winding in inductive relation to each of said three first-mentioned windings, respectively, each coupled winding being connected between two of said cathode lead terminals and having a midpoint tap, and a three-phase interphase transformer means having three terminal phase connections joined to the three midpoint taps, respectively, and having a neutral connection, said interphase transformer means having windings so disposed as to balance out the direct-current flux while keeping the currents in the three terminal phase connections substantially equal to each other, the positive conductor of the direct-current line being connected to the interphase neutral connection, and the negative conductor of the direct-current line being grounded and being connected to the common bus terminal of the six metal containers.

22. A vapor-arc asymmetrically conducting device comprising a sealed-off, evacuated, thoroughly treated-out container whereby the device operates without any pumping during its operation, a single active main cathode of vaporizable reconstructing cathode-material, a single active main anode, a make-alive of resistance material in contact with the main cathode for forming a cathode spot on the main cathode only at the beginning of each conducting period of the device and means for interrupting current flow to said make-alive electrode whereby substantially no ions or electrons are supplied to the space between said main cathode and said main anode during non-arcing periods.

23. A vapor-arc asymmetrically conducting device comprising an evacuated container, a single active main cathode of vaporizable reconstructing cathode-material, a single active main anode, make-alive means for forming a cathode spot on the main cathode only at the beginning of each conducting period of the device whereby substantially no ions or electrons are supplied to the space between said main cathode and said main anode during non-arcing periods, said main anode having a hollow interior, water in said main anode, a water-condenser connected to the interior of said main anode for receiving steam therefrom, condensing it, and returning it to said main anode, and a safety-valve on said water-condenser.

24. An intermittently arcing, asymmetrically conducting device comprising an evacuated container, a single main acting anode and a single main acting cathode therein, the active surface of at least the cathode being of a vaporizable reconstructing material, intermittently operative make-alive means for forming a cathode spot on the main cathode at the beginning of each arcing period, and an external capacitance-and-resistance impedance circuit shunting the arc between the main anode and the main cathode for delaying the rise of negative arcing voltages during the transition periods immediately following the terminations of the arcing periods of the device.

25. Means for transferring power between an alternating-current source and a direct-current load, comprising a plurality of rectifiers, each comprising an evacuated container, a single main acting anode and a single main acting cathode therein, the active surface of at least the cathode being of a vaporizable reconstructing material, intermittently operative make-alive means for forming a cathode spot on the main cathode of each rectifier at the beginning of each arcing period thereof, a special reactor individual to each of the several arcing paths of the several rectifiers and externally connected in series thereto, each reactor being of a type which saturates at currents which are a small percentage of the total current therethrough during the arcing periods of the rectifier with which it is associated, and an external circuit-means shunting the arc between the main anode and the main cathode of each rectifier for delaying the rise of negative arcing voltages during the transition periods immediately following the terminations of the arcing periods of said rectifier.

26. Means for transferring power between an alternating-current source and a direct-current load, comprising rectifying means comprising a plurality of rectifying arcs, a special reactor individual to each of the several rectifying arcs and externally connected in series thereto, each reactor being of a type which saturates at currents which are a small percentage of the total current therethrough during the arcing periods of the rectifying arc with which it is associated, and an external circuit-means shunting each of the rectifying arcs, said circuit-means comprising an energy storing device and impedance means for regulating the flow of energy to said storage means.

27. A vapor-arc asymmetrically conducting device comprising an evacuated container, a single active main cathode of vaporizable reconstructing cathode-material, a single active main anode, make-alive means for forming a cathode spot on the main cathode only at the beginning of each conducting period of the device whereby substantially no ions or electrons are supplied to the space between said main cathode and said main anode during non-arcing periods, and cooling means for causing said main anode to operate at a sufficiently cold temperature to have condensed cathode-material on it during operation.

28. An asymmetrically conducting vapor-arc device comprising an evacuated container, said container having bottom, a top, and side walls, said bottom being formed by a cathode having an arc-forming portion including a vaporizable reconstructing cathode-material, said top being formed by a main anode, and said side walls being formed by an insulator-ring hermetically sealed to said cathode and to said main anode, and intermittently acting make-alive means for periodically striking an arc between said cathode and said main anode at the beginnings of the arcing periods of said vapor-arc device, said make-alive means being of a type which maintains no arc within said container during the non-conducting periods of said vapor-arc device.

29. An asymmetrically conducting vapor-arc device comprising an evacuated container, said container having a bottom, a top, and side walls, said bottom being formed by a cathode having an arc-forming portion including a vaporizable reconstructing cathode-material, said top being formed by a main anode, and said side walls being formed by an insulator-ring hermetically sealed to, and between, said cathode and said main anode, said main anode having an arc-terminal portion formed by the bottom face of a downwardly extending projection, and intermittently acting make-alive means for periodically striking an arc between said cathode and said main anode at the beginning of the arcing periods of said vapor-arc device, said make-alive means being of a type which maintains no arc within said container during the non-conducting periods of said vapor-arc device.

30. An asymmetrically conducting vapor-arc device comprising an evacuated container, a cathode of vaporizable reconstructing material within said container, a single main anode constituting at least the major portion of the top wall of said container, said main anode having a central hole, pumping connection means for evacuating said container through said hole, an auxiliary electrode comprising a metallic stem extending through said hole and insulated from said anode and a tip of resistance material in contact with the cathode, and means for periodically applying potential to said electrode for striking an arc between said cathode and said main anode at the beginnings of the arcing periods of said vapor-arc device, said make-alive means being of a type which maintains no arc within said container during the non-conducting periods of said vapor-arc device.

31. An asymmetrically conducting vapor-arc device comprising an evacuated container, said container having a bottom, a top, and side walls, said bottom being formed by a cathode having an arc-forming portion including a vaporizable reconstructing cathode-material, said top being formed by a main anode, and said side walls being formed by an insulator-ring hermetically sealed to, and between, said cathode and said main anode, said main anode having an arc-terminal portion formed by the bottom face of a downwardly extending projection spaced close to said insulator-ring, a baffle between said projection and said ring, and intermittently acting make-alive means for periodically striking an arc between said cathode and said main anode at the beginnings of the arcing periods of said vapor-arc device, said make-alive means being of a type which maintains no arc within said container during the non-conducting periods of said vapor-arc device.

32. An asymmetrically conducting vapor-arc translating device for transferring power from a direct-current circuit to an alternating-current circuit, said device comprising a plurality of evacuated containers each container having two, and only two, operating main electrodes therein and an auxiliary starting electrode therein, said operating main electrodes being an anode and a cathode, respectively, the operative portion of at least the cathode main electrode including a vaporizable reconstructing cathode-material, an alternating-current circuit means connected between the anode of the auxiliary electrode and the cathode main electrode of the vapor-arc translating device for supplying intermittent, unidirectional power to said auxiliary starting electrode so as to effect the periodic initiation of the conducting periods in said vapor-arc translating device, and a capacitor connected to corresponding main electrodes in each container for periodically reversing the voltage thereon at the close of each conducting period.

33. Means for translating power between a three-phase line and a direct-current line, comprising six vapor-arc asymmetrically conducting devices having one common bus terminal and six unidirectional-current phase terminals, each vapor-arc device comprising a container having therein a single active main anode, a single active main cathode and a normally arcless make-alive means whereby no arc exists in any container during its non-conducting period, transformer means comprising three windings connected to said three-phase line, a separate coupled winding in inductive relation to each of said three first-mentioned windings, respectively, each coupled winding being connected between two of said unidirectional-current phase terminals and having a midpoint tap, and a three-phase interphase transformer means comprising a plurality of Scott-connected single-phase transformers having three terminal phase connections and a neutral connection, said three terminal phase connections being joined to the three midpoint taps, respectively, and the direct-current line being connected between the interphase neutral connection and the common bus terminal of the vapor-arc devices.

34. Means for translating power between a three-phase line and a direct-current line, comprising asymmetrically conducting means comprising six asymmetrically conducting current-paths having one common bus terminal and six unidirectional-current phase terminals, transformer means comprising three windings connected to said three-phase line, a separate coupled winding in inductive relation to each of said three first-mentioned windings, respectively, each coupled winding being connected between two of said unidirectional-current phase terminals and having a midpoint tap, and a three-phase interphase transformer means comprising a plurality of independent magnetizable flux-paths and windings thereon having three terminal phase connections and a neutral connection, said three terminal phase connections being joined to the three midpoint taps, respectively, and the direct-current line being connected between the interphase neutral connection and the common bus terminal of the asymmetrically conducting means, said three-phase interphase transformer comprising two Scott-connected single-phase transformers.

35. A device for transferring power between an alternating-current line and a direct-current line, comprising means, including a plurality of asymmetrically conducting paths, for providing three parallel paths of approximately equal direct currents flowing through said asymmetrically conducting paths on the alternating-current side thereof, and a three-phase interphase transformer means having three terminal phase connections joined to said three parallel paths, respectively, and having a neutral connection joined to one of the conductors of said direct-current line, said three-phase interphase transformer line consisting of two separate single-phase transformers one of which has a winding having approximately .866 times the number of turns of the other winding, the shorter winding being connected, at one terminal, to the approximate midpoint of the longer winding and having a tap for said neutral connection located approximately ⅓ of the way from said midpoint terminal.

36. A device for transferring power between an alternating-current line and a direct-current line, comprising means, including a plurality of asymmetrically conducting paths, for providing three parallel paths of approximately equal direct currents flowing through said asymmetrically conducting paths on the alternating-current side thereof, and a three-phase interphase transformer means having three terminal phase connections joined to said three parallel paths, respectively, and having a neutral connection joined to one of the conductors of said direct-current line, said three-phase interphase transformer consisting of two separate single-phase autotransformers, one of said autotransformers being connected, at one terminal, to the approximate midpoint of the other and having a tap for said neutral connection located approximately ⅓ of the way from said midpoint terminal.

37. A vapor-arc asymmetrically conducting device comprising an evacuated container, a single active main cathode of vaporizable reconstructing cathode-material, a single active main anode, make-alive means for forming a cathode spot on the main cathode only at the beginning of each conducting period of the device whereby substantially no ions or electrons are supplied to the space between said main cathode and said main anode during non-arcing periods, an insulating device of such design that it is not easily bridged by condensed cathode-material or dirt for insulating the main anode and the main cathode from each other, cooling means for causing said main anode to operate at a temperature below 300° C. during operation, and still cooler means for cooling the main cathode.

38. A vapor-arc asymmetrically conducting device comprising an evacuated container, a single active main cathode of vaporizable reconstructing cathode-material, a single active main anode spaced between about one-half of an inch and about three inches from said main cathode, make-alive means for forming a cathode spot on the main cathode only at the beginning of each conducting period of the device whereby substantially no ions or electrons are supplied to the space between said main cathode and said main anode during non-arcing periods, cathode-spot fixation means for the main cathode, cooling means for causing said main anode to operate at a temperature below about 300° C. during operation, and cooling means for said main cathode and for said cathode-spot fixation means.

39. A vapor-arc asymmetrically conducting device comprising an evacuated container, a single active main cathode of vaporizable reconstructing cathode-material, a single active main anode, make-alive means for forming a cathode spot on the main cathode only at the beginning of each conducting period of the device whereby substantially no ions or electrons are supplied to the space between said main cathode and said main anode during non-arcing periods, and cooling means for cooling said main cathode, said cooling means including horizontal pipes immersed in the cathode-material, the top portions of said pipes having spot-fixing surfaces.

40. A vapor-arc asymmetrically conducting device comprising an evacuated container, a single active main cathode of vaporizable reconstructing cathode-material, a single active main anode, make-alive means for forming a cathode spot on the main cathode only at the beginning of each conducting period of the device whereby substantially no ions or electrons are supplied to the space between said main cathode and said main anode during non-arcing periods, and cooling means for cooling said main cathode, said cooling means including horizontal pipes immersed in the cathode-material, the top portions of said pipes having spot-fixing surfaces, and means for circulating a cooling medium through said pipes, the temperature of said cooling medium and the closeness of the spacing of said pipes being such that the calculated temperature of any point on the cathode surface cannot be hotter than about 200° C.

41. A vapor-arc asymmetrically conducting device comprising an evacuated container, a single active main cathode of vaporizable reconstructing cathode-material, a single active main anode, make-alive means for forming a cathode spot near the center of the main cathode and only at the beginning of each conducting period of the device whereby substantially no ions or electrons are supplied to the space between said main cathode and said main anode during non-arcing periods, and cooling means for cooling said main cathode, said cooling means including metal-walled means for carrying a cooling fluid, and horizontal metallic spot-fixing means extending out radially from said center make-alive spot and extending downwardly in good metallic contact with said cooling fluid.

42. A vapor-arc asymmetrically conducting device comprising an evacuated container, a single active main cathode of vaporizable reconstructing cathode-material, a single active main anode, make-alive means for forming a cathode spot on the main cathode only at the beginning of each conducting period of the device whereby substantially no ions or electrons are supplied to the space between said main cathode and said mains anode during non-arcing periods, and cooling means for cooling said main cathode, said cooling means including horizontal pipes immersed in the cathode-material, the top portion of said pipes being about level with the cathode surface when the device is not in use and having a surface composed of an indestructible mercury-wet metallic substance suitable for spot-fixation.

43. A vapor-arc asymmetrically conducting device comprising an evacuated container, a plurality of main electrodes, one of said electrodes being a main cathode of vaporizable reconstructing material, means for starting an arc terminating on said cathode, and cooling means for cooling said main cathode, said cooling means including horizontal pipes immersed in the cathode-material, the top portions of said pipes having spot-fixing surfaces.

44. A vapor-arc asymmetrically conducting device comprising an evacuated container, a plurality of main electrodes, one of said electrodes being a main cathode of vaporizable reconstructing material, means for starting an arc terminating on said cathode, and cooling means for cooling said main cathode, said cooling means including horizontal pipes immersed in the cathode-material, the top portions of said pipes having spot-fixing surfaces, and means for circulating a cooling medium through said pipes, the temperature of said cooling medium and the closeness of the spacing of said pipes being such that the calculated temperature of any point on the cathode surface except the cathode spot cannot be hotter than about 60° or 80° C.

45. A vapor-arc asymmetrically conducting device comprising an evacuated container, a plurality of main electrodes, one of said electrodes being a main cathode of vaporizable reconstructing material, means for starting an arc terminating near the center of said cathode, means for cooling said main cathode, said cooling means including metal-walled means for carrying a cooling fluid, and horizontal metallic spot-fixing means extending out radially from said center make-alive spot and extending downwardly in good metallic contact with said cooling fluid.

46. A vapor-arc asymmetrically conducting device comprising an evacuated container, a plurality of main electrodes, one of said electrodes being a main cathode of vaporizable reconstructing material, means for starting an arc terminating on said cathode, and cooling means for cooling said main cathode, said cooling means including horizontal pipes immersed in the cathode-material, the top portions of said pipes being about level with the cathode surface when the device is not in use and having a surface composed of an indestructible mercury-wet metallic substance suitable for spot-fixation.

47. A vapor-arc asymmetrically conducting device comprising an evacuated container, a plurality of main electrodes, one of said electrodes being a main cathode of vaporizable reconstructing material, means for starting an arc terminating on said cathode, and means for preventing excessive evaporation of the cathode-material, comprising a refractory metal strip in contact with the surface of the cathode-material and extending below said surface, and means for directly cooling said strip.

48. An arcing device comprising two spaced electrodes between which an arc is to be struck, and a make-alive device for starting an arc therebetween, said make-alive device being a solid rod of poorly conducting material in firm contact with one of said two spaced electrodes, and means responsive to the polarity of the other electrode for supplying make-alive potential to said rod.

49. An arcing device comprising two spaced electrodes between which an arc is to be struck, and a make-alive device for starting an arc therebetween, said make-alive device being a solid rod of poorly conducting material in firm contact with one of said two spaced electrodes, a separate terminal holder for the other end of said rod, and means for causing the arc-striking voltage at the holder end of said rod to be much higher than at the electrode-engaging end thereof.

50. A lightning arrester for use on alternating-current circuits, comprising a perforated tube of insulating material, an electrode in each end of the tube, the length of the tube being such that a power arc formed therein will automatically go out when the voltage passes through zero without of itself restriking in reverse polarity, make-alive means associated with each of said electrodes within said tube for selectively forming a cathode spot on either one of said electrodes, and excess-voltage-responsive means for energizing said make-alive means.

51. A lightning arrester for use on alternating-current circuits, comprising a perforated tube of insulating material, an electrode in each end of the tube, the length of the tube being such that a power arc formed therein will automatically go out when the voltage passes through zero without of itself restriking in reverse polarity, make-alive means for each of said electrodes within said tube for forming a cathode spot on either one of said electrodes, and a serially connected, normally substantially non-conducting device for breaking down when an excessive voltage appears on the alternating-current circuit.

52. A lightning arrester for use on alternating-current circuits, comprising a perforated tube of insulating material, an electrode in each end of the tube, the length of the tube being such that a power arc formed therein will automatically go out when the voltage passes through zero without of itself restriking in reverse polarity, a pair of short rods of poorly conducting, substantially indestructible material making contacts with the respective electrodes within the tube, an external resistor joining the rods electrically, and a serially connected, normally substantially non-conducting device for breaking down when an excessive voltage appears on the alternating-current circuit.

53. A lightning arrester for use on an alternating-current circuit, comprising a pair of spaced electrodes, deionizing means for substantially enclosing and confining the arc-path between said electrodes, said deionizing means comprising substantially insulating solid material with a long, narrow space therebetween, the length of said space being such that a power arc formed therein will automatically go out when the voltage passes through zero without of itself restriking in reverse polarity, and a pair of short rods of poorly conducting, substantially indestructible material making contacts with the respective electrodes within said space.

54. A lightning arrester for use on an alternating-current circuit, comprising a pair of spaced electrodes, deionizing means for substantially enclosing and confining the arc-path between said electrodes, said deionizing means comprising substantially insulating solid material with a long, narrow space therebetween, the length of said space being such that a power arc formed therein will automatically go out when the voltage passes through zero without of itself restriking in reverse polarity, a pair of short rods of poorly conducting, substantially indestructible material making contacts with the respective electrodes within said space, and a serially connected, normally substantially non-conducting device for breaking down when an excessive voltage appears on the alternating-current circuit and for assisting in extinguishing the arc following an excess-voltage discharge.

55. An arcing device operating in air and comprising spaced stationary arc-terminal electrodes, deionizing material in the space between said electrodes, and make-alive means comprising a stationary, poorly conducting, substantially indestructible rod for forming a cathode spot on one of said electrodes within the space affected by said deionizing material.

56. An arcing device comprising spaced stationary arc-terminal electrodes, deionizing material in the space between said electrodes, and make-alive means comprising a stationary, poorly conducting, substantially indestructible rod for forming a cathode spot on one of said electrodes within the space affected by said deionizing material.

57. In combination, an electric discharge device having a plurality of principal electrodes and a starting electrode in contact with one of said principal electrodes, and out of contact with any other of said principal electrodes, power supply means for connecting said principal electrodes to the output terminals of said power supply means, means for intermittently transmitting and interrupting a current, said means including another electric discharge device of the type having input and output circuits, and means coupled to said input circuit for controlling the current transmitted through said output circuit, and means for connecting said output circuit between said starting electrode and the principal electrode out of contact with said starting electrode.

JOSEPH SLEPIAN.
LEON R. LUDWIG.

Certificate of Correction

Patent No. 2,069,283                                      February 2, 1937

JOSEPH SLEPIAN ET AL.

It is hereby certified that error appears in the printed specification of the above numbered patent requiring correction as follows:

Page 3, second column, line 32, for the word "bolts" read *volts*; page 4, first column, line 48, for "res stivity" read *resistivity*; page 9, second column, line 70, strike out "the", second occurrence; page 10, second column, line 31, for "irrespective" read *respective*; page 14, second column, line 21, for "termials" read *terminals*; page 15, second column, line 19, for "beginning" read *beginnings*; page 17, first column, line 46, for "mains" read *main*; line 50, for "portion" read *portions*; page 18, second column, line 34, after "means" insert , *means*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*